United States Patent
Ertl et al.

(10) Patent No.: US 12,485,102 B2
(45) Date of Patent: Dec. 2, 2025

(54) METHODS AND COMPOSITIONS FOR TREATING CANCER

(71) Applicant: The Wistar Institute of Anatomy and Biology, Philadelphia, PA (US)

(72) Inventors: Hildegund C. J. Ertl, Villanova, PA (US); Joseph M. Salvino, Chester Springs, PA (US); Valli V. S. Yellamelli, Philadelphia, PA (US)

(73) Assignee: The Wistar Institute of Anatomy and Biology, Philadelphia, PA (US)

( * ) Notice: Subject to any disclaimer, the term of this patent is extended or adjusted under 35 U.S.C. 154(b) by 661 days.

(21) Appl. No.: 16/635,217

(22) PCT Filed: Aug. 1, 2018

(86) PCT No.: PCT/US2018/044735
§ 371 (c)(1),
(2) Date: Jan. 30, 2020

(87) PCT Pub. No.: WO2019/028096
PCT Pub. Date: Feb. 7, 2019

(65) Prior Publication Data
US 2021/0113613 A1    Apr. 22, 2021

Related U.S. Application Data

(60) Provisional application No. 62/540,338, filed on Aug. 2, 2017.

(51) Int. Cl.
*A61K 31/216* (2006.01)
*A61K 31/197* (2006.01)
(Continued)

(52) U.S. Cl.
CPC .......... *A61K 31/216* (2013.01); *A61K 31/197* (2013.01); *A61K 40/11* (2025.01);
(Continued)

(58) Field of Classification Search
CPC .......... A61K 2039/5158; A61K 31/197; A61K 31/216; A61K 35/17; A61K 45/06;
(Continued)

(56) References Cited

U.S. PATENT DOCUMENTS 4,474,893 A    10/1984    Reading
4,676,980 A     6/1987    Segal et al.
(Continued)

FOREIGN PATENT DOCUMENTS

WO    WO 2012/079000    6/2012
WO    WO 2016/054153    4/2016
(Continued)

OTHER PUBLICATIONS

Ling (A Review of Currently Available Fenofibrate and Fenobric Acid Formulations, Cardiol Res . 2013;4(2):47-55).*
(Continued)

*Primary Examiner* — Jeffrey S Lundgren
*Assistant Examiner* — Anthony Joseph Seitz
(74) *Attorney, Agent, or Firm* — Howson & Howson, LLP; Colleen M. Schaller; Richard F. Kane

(57) ABSTRACT

Methods for treating cancer are disclosed which comprise administering to a subject T cells which have been pretreated ex vivo or in vitro with fenofibric acid (FFA), an FFA prodrug, or a derivative thereof that has PPAR-α agonist activity. These compounds promote the use of fatty acid catabolism rather than glucose for energy and promote enhanced recovery of, and biomass production by, the pre-treated T cells. Still other methods comprise co-administering to a subject having a cancer characterized by a solid tumor an immunotherapeutic composition targeting an antigen or ligand on the tumor cell and the pretreated T cells. The method may also employ co-administration of a check-
(Continued)

Fenofibrate pre-treatment of CD8⁺ T cells: experimental design for vaccine model point inhibitor. Novel compositions comprise the pre-treated T cells. Novel FFA prodrugs are provided.

14 Claims, 16 Drawing Sheets

Specification includes a Sequence Listing.

(51) Int. Cl.
```
A61K 40/11      (2025.01)
A61K 40/31      (2025.01)
A61K 40/42      (2025.01)
A61K 45/06      (2006.01)
C07K 16/28      (2006.01)
```
(52) U.S. Cl.
CPC .............. *A61K 40/31* (2025.01); *A61K 40/42* (2025.01); *A61K 45/06* (2013.01); *A61K 2239/31* (2023.05); *A61K 2239/38* (2023.05); *A61K 2239/57* (2023.05); *C07K 16/2818* (2013.01)

(58) Field of Classification Search
CPC ..... A61P 35/00; C07K 16/2818; C08F 10/10; C08F 2/32; C08F 2810/10
See application file for complete search history.

(56) References Cited

U.S. PATENT DOCUMENTS

| | | | |
|---|---|---|---|
| 4,816,567 | A | 3/1989 | Cabilly et al. |
| 8,613,922 | B2 | 12/2013 | Clemmons et al. |
| 9,402,888 | B2 | 8/2016 | Ertl et al. |
| 11,382,886 | B2 * | 7/2022 | Ertl ...................... C12N 5/0636 |
| 2005/0171032 | A1 | 8/2005 | Solomon |
| 2007/0259959 | A1 | 11/2007 | Cortese et al. |
| 2011/0178112 | A1 | 7/2011 | Kristiansesn et al. |
| 2013/0287748 | A1 | 10/2013 | June et al. |

FOREIGN PATENT DOCUMENTS

| | | | |
|---|---|---|---|
| WO | WO 2017/123911 | 7/2017 | |
| WO | WO-2017123911 A1 * | 7/2017 | ........... A61K 31/192 |

OTHER PUBLICATIONS

Arakawa et al., Arterioscler Thromb Vasc Biol. Jun. 2005;25(6):1193-7 (Year: 2005).*
Ling H, Luoma JT, Hilleman D. A Review of Currently Available Fenofibrate and Fenofibric Acid Formulations. Cardiol Res. Apr. 2013;4(2):47-55. Epub May 9, 2013 (Year: 2013).*
Zhu, T., Ansquer, J.-C., Kelly, M. T., Sleep, D.J. and Pradhan, R.S. (2010), Comparison of the Gastrointestinal Absorption and Bioavailability of Fenofibrate and Fenofibric Acid in Humans. The Journal of Clinical Pharmacology, 50: 914-921 (Year: 2010).*
Ahmadzadeh et al., Tumor antigen-specific CD8 T cells infiltrating the tumor express high levels of PD-1 and are functionally impaired, Blood, vol. 114(8):1537-1544, Aug. 2009.
Azuma et al., B7-H1 is a ubiquitous antiapoptotic receptor on cancer cells, Blood, vol. 111(7):3635-3643, Apr. 2008.
Bailey et al., Targeting the metabolic microenvironment of tumors, Advances in Pharmacology, vol. 65:63-107, 2012.
Baitsch et al., Exhaustion of tumor-specific CD8+ T cells in metastases from melanoma patients, Journal of Clinical Investigation, vol. 121(6):2350-60, Jun. 2011.
Brahmer et al., Safety and Activity of Anti-PD-L1 Antibody in Patients with Advanced Cancer, The New England Journal of Medicine, vol. 366:2455-2465, Jun. 2012.
Bucks et al., Chronic antigen stimulation alone is sufficient to drive CD8+ T cell exhaustion, Journal of Immunology, vol. 182(11):6697-6708, Jun. 2009.
Casazza et al., Tumor stroma: a complexity dictated by the hypoxic tumor microenvironment, Oncogene, vol. 33(14):1743-1754, Apr. 2014.
Chang et al., Metabolic Competition in the Tumor Microenvironment Is a Driver of Cancer Progression, Cell, vol. 162(6):1229-41, Sep. 2015.
Chapman et al., Rapid eradication of a bulky melanoma with one dose of immunotherapy, The New England Journal of Medicine, vol. 372(21):2073-2074, May 2015.
Clarke et al., Characterization of the ovalbumin-specific TCR transgenic line OT-I: MHC elements for positive and negative selection, Immunology and Cell Biology, vol. 8(2):110-117, Apr. 2000.
Crompton et al., Akt inhibition enhances expansion of potent tumor-specific lymphocytes with memory cell characteristics, Cancer Research, vol. 75(2):296-305, Jan. 2005.
Dalgleish, A., Therapeutic cancer vaccines: Why so few randomized phase III studies reflect the initial optimism of phase II studies, Vaccine, vol. 29(47):8501-8505, Nov. 2011.
Doedens et al., Hypoxia-inducible factors enhance the effector responses of CD8(+) T cells to persistent antigen, Nature Immunology, vol. 14(11):1173-82, Nov. 2013.
Finlay et al., PDK1 regulation of mTOR and hypoxia-inducible factor 1 integrate metabolism and migration of CD8+ T cells, Journal of Experimental Medicine, vol. 209(13):2441-2453, Dec. 2012.
Grosso et al., LAG-3 regulates CD8+ T cell accumulation and effector function in murine self-and tuor-tolerance systems, Journal of Clinical Investigation, vol. 117(11):3383-3392, Nov. 2007.
Hamanaka et al., Targeting glucose metabolism for cancer therapy, Journal of Experimental Medicine, vol. 209(2):211-215, Feb. 2012.
Ho et al., Phosphoenolpyruvate is a metabolic checkpoint of anti-tumor T cell response, Cell, vol. 162(6):1217-28, Sep. 2015.
Kalos et al., T cells with chimeric antigen receptors have potent antitumor effects and can establish Memory in Patients with Advanced Leukemia, Science Translational Medicine, vol. 3(95):95ra73, Aug. 2011.
Kleffel et al., Melanoma Cell-Intrinsic PD-1 Receptor Functions Promote Tumor Growth, Cell, vol. 162(6):1242-1256, Sep. 2015.
Larkin et al., Combined Nivolumab and Ipilimumab or Monotherapy in Untreated Melanoma, The New England Journal of Medicine, vol. 373:23-34, Jul. 2015.
Lasaro et al., Targeting of antigen to the herpesvirus entry mediator augments primary adaptive immune responses, Nature Medicine, vol. 14(2):205-212, Feb. 2008.
Lochner et al., Fatty acid metabolism in the regulation of T cell function, Trends in Immunology, vol. 36(2):472-478, Feb. 2015.
Lu et al., Metabolomic analysis via reversed-phase ion-pairing liquid chromatography coupled to a stand-alone orbitrap mass spectrometer, Analytical Chemistry, vol. 82(8):3212-21, Apr. 2010.
Martinez-Outschoorn et al., Ketone body utilization drives tumor growth and metastasis, Cell Cycle, vol. 11(21):3964-71, Nov. 2012.
Marvel, D., & Gabrilovich, D., Myeloid-derived suppressor cells in the tumor microenvironment: expect the unexpected, Journal of Clinical Investigation, vol. 125(9):3356-3364, Sep. 2015.
McNamee et al., Hypoxia and hypoxia-inducible factors as regulators of T cell development, differentiation, and function, Immunology Research, vol. 5(1-3):58-70, Mar. 2013.
Menendez, J., & Lupu, R., Fatty acid synthase and lipogenic phenotype in cancer pathogenesis, Nature Reviews. Cancer, vol. 7(10):763-777, Oct. 2007.
Mrass et al., Random migration precedes stable target cell interactions of tumor-infiltrating T cells, Journal of Experimental Medicine, vol. 203(12):2749-2761, Nov. 2006.
Mueller, S., & Ahmed, R., High antigen levels are the cause of T cell exhaustion during chronic viral infection, PNAS, vol. 106(21):8623-8628, May 2009.
Ohta et al., In vivo T cell activation in lymphoid tissues is inhibited in the oxygen-poor microenvironment, Frontiers in Immunology, vol. 2:27, Jul. 2011.
Palmer et al., Glucose metabolism regulates T cell activation differentiation, and functions, Frontiers in Immunology, vol. 6:1-6, Jan. 2015.

(56) References Cited

OTHER PUBLICATIONS

Parry et al., CTLA-4 and PD-1 receptors inhibit T-cell activation by distinct mechanisms, Molecular and Cellular Biology, vol. 25(21):9543-53, Nov. 2005.
Patsoukis et al., PD-1 alters T-cell metabolic reprogramming by inhibiting glycolysis and promoting lipolysis and fatty acid oxidation, Nature Communications, vol. 6(6692), Mar. 2015.
Patsoukis et al., PD-1 increases PTEN phosphatase activity while decreasing PTEN protein stability by inhibiting casein kinase 2, Molecular and Cellular Biology, vol. 33(16):3091-3098, Aug. 2013.
Pearce et al., Fueling immunity: insights into metabolism and lymphocyte function, Science, 342(6155): 1242454, Oct. 2013.
Pescador et al., Identification of a functional hypoxia-responsive element that regulates the expression of the egl nine homologue 3 (egln3/phd3) gene, The Biochemical Journal, vol. 390(Pt 1):189-197, Aug. 2005.
Sadelain et al., The basic principles of chimeric antigen receptor (CAR) design, Cancer Discovery, vol. 3(4):388-398, Apr. 2013.
Schlie et al., When Cells Suffocate: Autophagy in Cancer and Immune Cells under Low Oxygen, International Journal of Cell Biology, vol. 470597-13, Nov. 2011.
Sharma et al., Immune checkpoint targeting in cancer therapy: toward combination strategies with curative potential, Cell, vol. 161(2):205-214, Apr. 2015.
Siska et al., T cell metabolic fitness in antitumor immunity, Trends in Immunology, vol. 36(4):257-64, Apr. 2015.
Sukumar et al., Inhibiting glycolytic metabolism enhances CD8+T cell memory and antitumor function, Journal of Clinical Investigation, vol. 123(10):4479-88, Oct. 2013.
Takahashi et al., Roles and regulation of ketogenesis in cultured astroglia and neurons under hypoxia and hypoglycemia, ASN Neuro, vol. 6(5):1759091414550997, Jul.-Sep. 2014.
Tatsis et al., Adenoviral vectors persist in vivo and maintain activated CD8+ T cells: implications for their use as vaccines, Blood, vol. 110(6):1916-1923, Sep. 2007.
Veech et al., The therapeutic implications of ketone bodies: the effects of ketone bodies in pathological conditions: ketosis, ketogenic diet, redox states, insulin resistance, and mitochondrial metabolism, Prostaglandins Leukot Essent Fatty Acids, vol. 70(3):309-19, Mar. 2004.
Walker et al., Interaction of human IgG chimeric antibodies with the human FcRI and FcRII receptors: requirements for antibody-mediated host cell-target cell interaction, Molecular Immunology, vol. 26(4):403-11, Apr. 1989, Abstract.
Wang, R., & Green, D., Metabolic checkpoints in activated T cells, Nature Immunology, vol. 13(10):907-915, Oct. 2012.
Warburg, O., On respiratory impairment in cancer cells, Science, vol. 124(3215):269-70, Aug. 1956.
Wherry et al., T cell exhaustion, Nature Immunology, vol. 12(6):492-499, Jun. 2011.
Wiig et al., Isolation of interstitial fluid from rat mammary tumors by a centrifugation method, American Journal of Physiology. Heart and Circulatory Physiology, vol. 284(1):H416-24, Jan. 2003.
Wilk et al., Molecular Mechanisms of Fenofibrate-Induced Metabolic Catastrophe and Glioblastoma Cell Death, Molecular and Cellular Biology, vol. 35(1):182-198, Jan. 2015.
Yang, J., The adoptive transfer of cultured T cells for patients with metastatic melanoma, Clinics in Dermatology, vol. 31(2):209-219, Mar.-Apr. 2013.
Zhang et al., Stromal progenitor cells from endogenous adipose tissue contribute to pericytes and adipocytes that populate the tumor microenvironment, Cancer Research, vol. 72(20):5198-208, Oct. 2012.
Zhang et al., The effect of adjuvanting cancer vaccines with herpes simples virus glycoprotein D on melanoma-driven CD8+ T cell exhaustion, Journal of Immunology, vol. 193(4):1836-1846, Aug. 2014.
Zhang, F., & Guangwei, D., Dysregulated lipid metabolism in cancer, World Journal of Biological Chemistry, vol. 3(8):167-74, Aug. 2012.
Zou et al., PD-L1 (B7-H1) and PD-1 pathway blockade for cancer therapy: Mechanisms, response biomarkers, and combinations, Science Translational Medicine, vol. 8(328):328rv4, Mar. 2016.
International Preliminary Report on Patentability dated Feb. 13, 2020 issued in corresponding International Patent Application No. PCT/US2018/044735.
International Search Report and Written Opinion dated Oct. 4, 2018 issued in corresponding International Patent Application No. PCT/US2018/044735.

\* cited by examiner

Fenofibrate pre-treatment of CD8⁺ T cells: experimental design for vaccine model FIG. 2  Fenofibrate increases TIL functions (vaccine model)

PD-1 delays tumor progression independent of the immune system

PD-1 blockade neither affects TIL metabolism nor functions

PD-1 blockade acts synergistically with fenofibrate pre-treatment

.... but fenofibrate inhibits complex I of the electron transfer chain

Fenofibric acid has PPAR-α agonist activity but does not cross mitochondrial membranes, so it is not as toxic as fenofibrate in vitro Fenofibric acid does not block blast formation Fenofibric acid pre-treatment of OT-1 CD8+ T cells increases *in vivo* efficacy in the B16$_{OVA}$ model Effect of fenofibric acid on TIL metabolism Effect of fenofibric acid on functions of transferred CD8+ T cells GW7647 CAS No. 265129-71-3

SEQUENCE LISTING

```
<160> NUMBER OF SEQ ID NOS: 1

<210> SEQ ID NO 1
<211> LENGTH: 8
<212> TYPE: PRT
<213> ORGANISM: Mus musculus

<400> SEQUENCE: 1

Ser Ile Ile Asn Phe Glu Lys Leu
1               5
```

METHODS AND COMPOSITIONS FOR TREATING CANCER

CROSS-REFERENCE TO RELATED APPLICATIONS

This application is a 371 of International Patent Application No., PCT/US2018/044735, filed on Aug. 1, 2018, which claims the benefit of the priority of U.S. Provisional Patent Application No. 62/540,338, filed Aug. 2, 2017, which applications are incorporated herein by reference.

BACKGROUND OF THE INVENTION

Despite recent progress in cancer immunotherapy,[7,29] cures remain rare even for highly immunogenic tumors such as melanomas. The tumor microenvironment (TME) poses significant metabolic challenges to tumor infiltrating T lymphocytes (TILs) due to disorganized vascularization, presence of toxic products derived from tumor and stromal cells and lack of nutrients and oxygen ($O_2$).[2] Recent papers show that lack of glucose impairs effect functions of TILs.[6,14] Tumors not only lack glucose but also oxygen. Functional declines of TILs dampen the efficacy of immunotherapy for solid tumors. This is thought to reflect in part their exhaustion driven by continuous antigenic stimulation. Adoptive transfer of ex vivo expanded TILs may affect regression of large melanomas[38]. Nevertheless, traditional vaccines that aim to induce such T cells have largely been ineffective.[9] Exhaustion of tumor antigen (TA)-specific CD8+T cells[1,3] is characterized by their enhanced expression of co-inhibitors, decreased levels of the transcription factor T-bet and loss of effector functions[36] following chronic tumor-derived antigen stimulation.[22] T cell exhaustion has been implicated to cause failures of active immunotherapy for solid tumors.

TILs require energy to eliminate tumor cells. Upon activation T cells enhance energy production through glycolysis,[34]. Glycolysis is less efficient than oxidative phosphorylation (OXPHOS), but provides building blocks for biomass formation and cell proliferation. Tumor cells also use glycolysis,[13] which may lead to glucose (Glu) depletion within the TME.[6,14] T cells with limited access to Glu should rely on OXPHOS to produce energy. Although many substances including fatty acids (FAs) can fuel OXPHOS, it requires $O_2$, which can become limiting within tumors due to insufficient blood supply.[19] TILs therefore face dual metabolic jeopardy, which drives their functional exhaustion and thereby impairs the efficacy of cancer immunotherapy.

Thus, metabolism plays an important role in modulating T cell effector functions. There remains a need in the art for new and effective tools and methods to facilitate treatment and prophylactic therapies for cancer.

SUMMARY OF THE INVENTION

In one aspect, a method for treating cancer comprises administering to a subject having a cancer characterized by a solid tumor a T cell or T cell population that is pretreated or conditioned ex vivo or in vitro with fenofibric acid (FFA), an FFA prodrug, or a derivative thereof that has PPAR-α agonist activity. In another embodiment, this method involves co-administering a checkpoint inhibitor in the form of an antibody or a small molecule.

In another aspect, a method for treating cancer comprises co-administering to a subject having a cancer characterized by a solid tumor an immunotherapeutic composition targeting an antigen or ligand on the tumor cell; and selected T cells pretreated ex vivo or treated upon transfer with fenofibric acid (FFA) an FFA prodrug, or a derivative thereof that has PPAR-α agonist activity. The cells are pre-treated prior to or upon adoptive cell transfer. In another embodiment, this method involves co-administering a checkpoint inhibitor in the form of an antibody or a small molecule.

In another aspect, a method for treating cancer comprises co-administering the immunotherapeutic composition, the above-noted compound, prodrug, or derivative and the selected T cells identified herein. In another embodiment, this method involves co-administering a checkpoint inhibitor in the form of an antibody or a small molecule.

In another aspect, a method of modifying a T cell comprises pretreating the T cell ex vivo or in vitro with fenofibric acid (FFA), an FFA prodrug, or a derivative thereof that has PPAR-α agonist activity.

In another aspect, a method of enhancing the survival of a T cell, e.g., an autologous T cell, a chimeric antigen receptor-T cell, a chimeric endocrine receptor-T cell or ex vivo expanded tumor antigen-specific T cells comprising treating the T cell(s) ex vivo with fenofibric acid (FFA), an FFA prodrug, or a derivative thereof that has PPAR-α agonist activity and does not inhibit complex I of the electron transport chain before or upon adoptive cell transfer to a subject having a solid tumor.

In still a further aspect, a composition is provided for adoptive transfer to a mammalian subject comprising a T cell that has been pretreated ex vivo or in vitro with fenofibric acid (FFA), an FFA prodrug, or a derivative thereof that has PPAR-α agonist activity.

In another aspect, a novel FFA prodrug or derivative compound (S)-2-((S)-2-(2-(4-(4-chlorobenzoyl)phenoxy)-2-methylpropanamido)propanamido)pentanedioic acid (also referenced as FFP or Compound 4) is provided.

In another aspect, a novel FFA prodrug or derivative compound, i.e, (S)-2-((S)-2-(2-(2-(4-(4-chlorobenzoyl)phenoxy)-2-methylpropanoyloxy)acetamido)propanamido) pentanedioic acid (Compound 8) is provided.

In still a further aspects, methods and pretreated T cells as described herein are provided which use, or are pretreated with, Compound 4 or Compound 8.

Other aspects and advantages of these compositions and methods are described further in the following detailed description of the preferred embodiments thereof.

DETAILED DESCRIPTION

Figure 1:
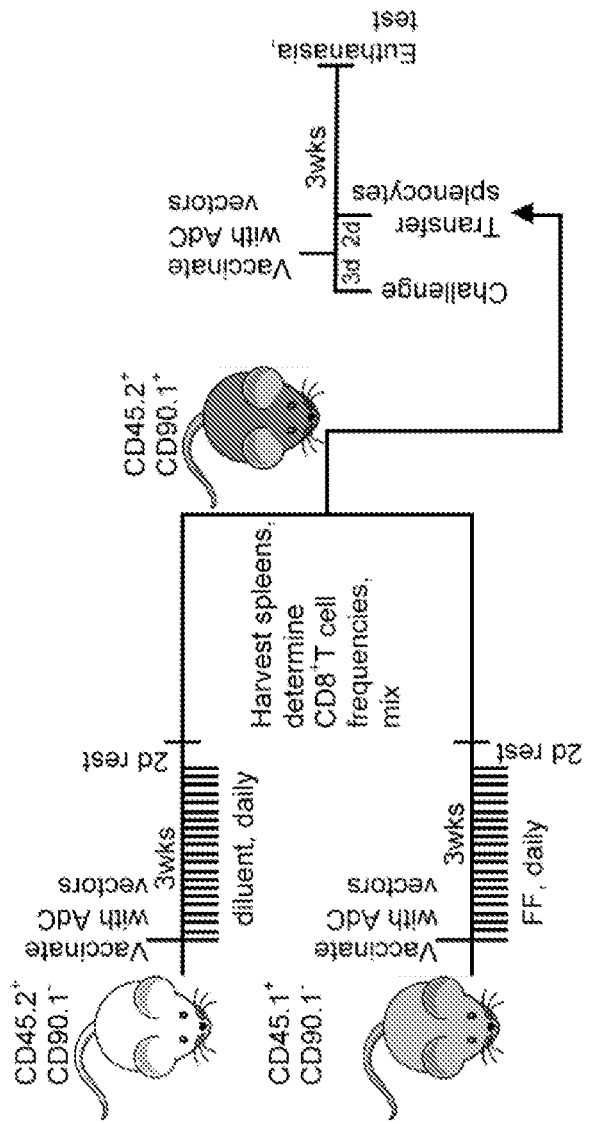
FIG. 1 is a cartoon showing the pre-treatment protocol of CD8+ cells, an experimental design for a vaccine model.
Figure 2:
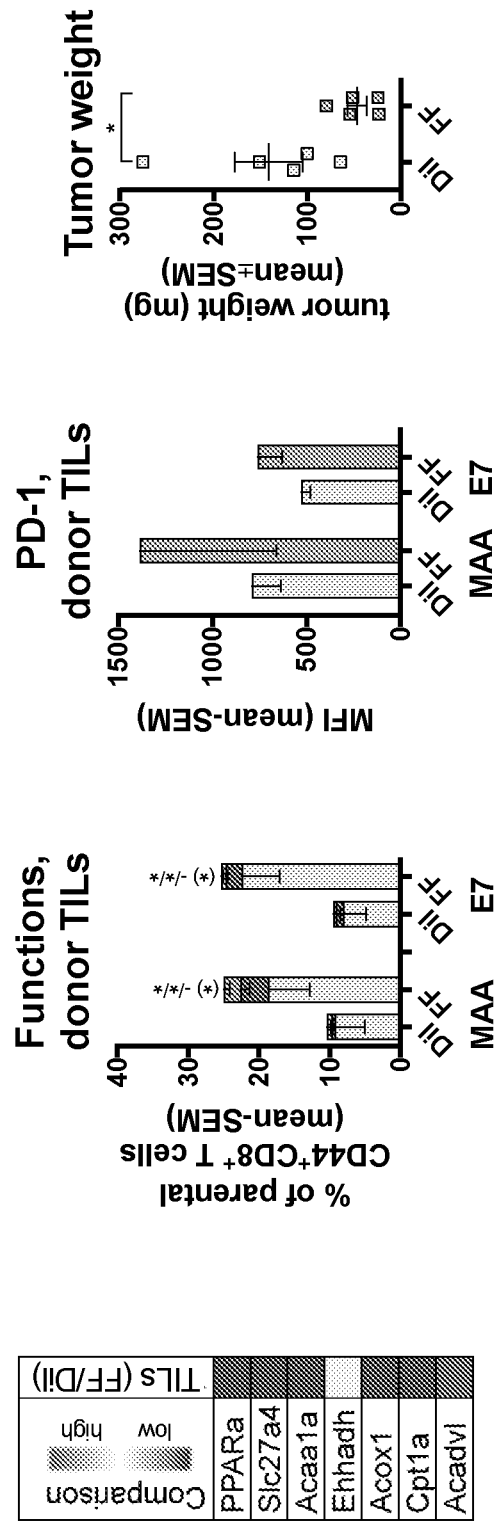
FIG. 2 shows evidence that fenofibrate FF increases TIL functions in the vaccine model.
Figure 3:
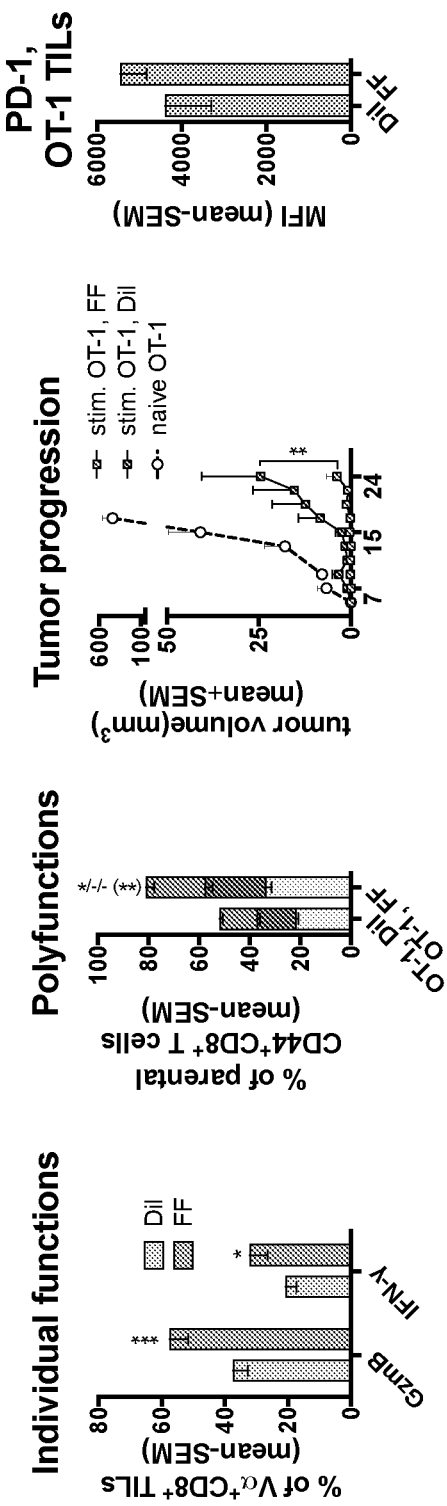
FIG. 3 shows four graphs supporting that FF pretreatment increases TIL functions in the OT-1 transfer model.
Figure 4:
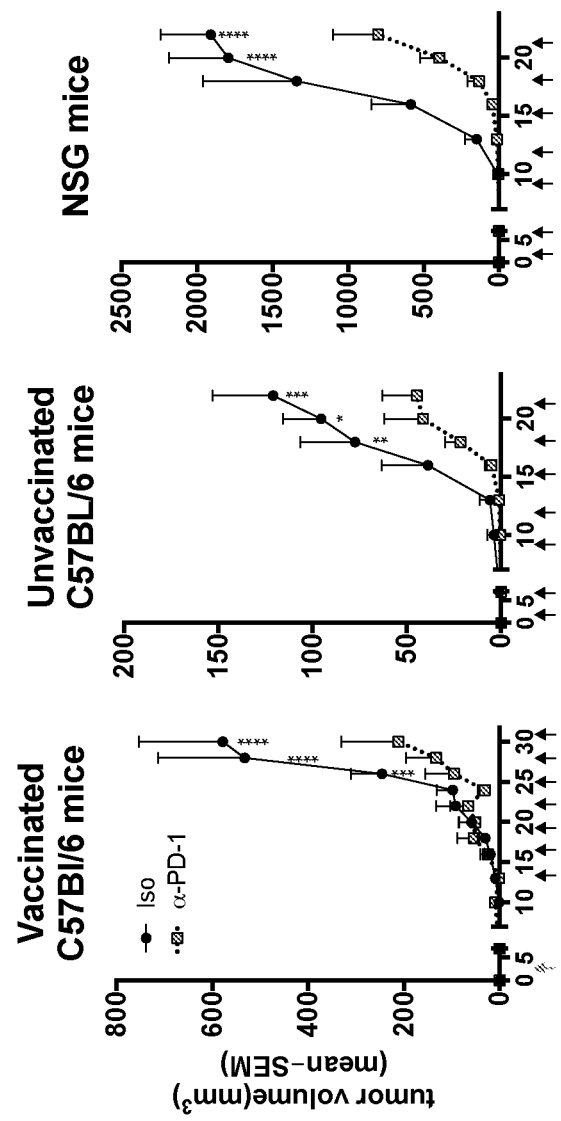
FIG. 4 shows three graphs demonstrating that PD-1 delays tumor progression independent of the immune system.
Figure 5:
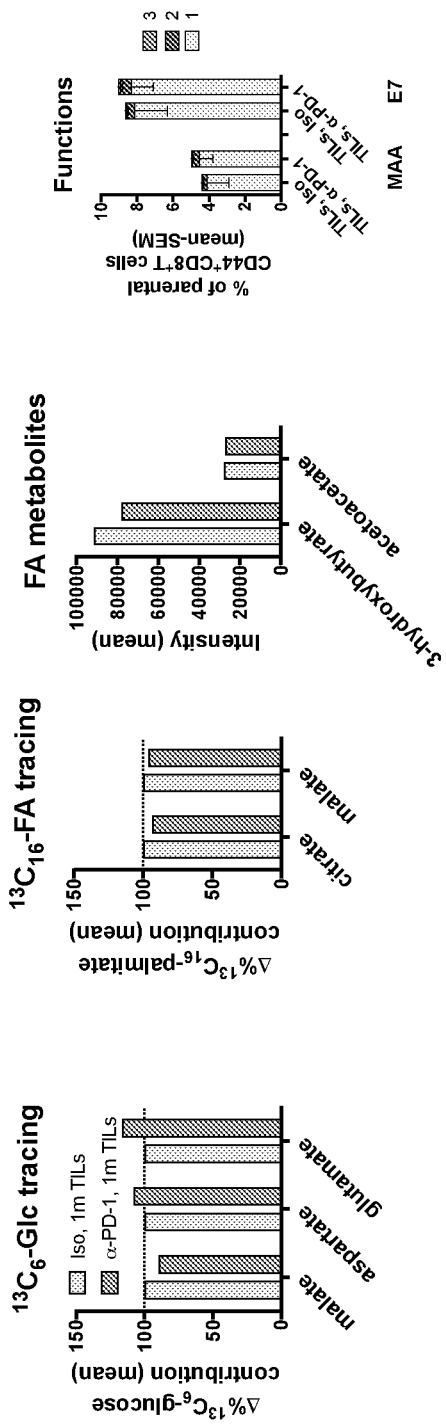
FIG. 5 are four graphs showing that PD-1 blockade does not affect TIL metabolism or functions.
Figure 6:
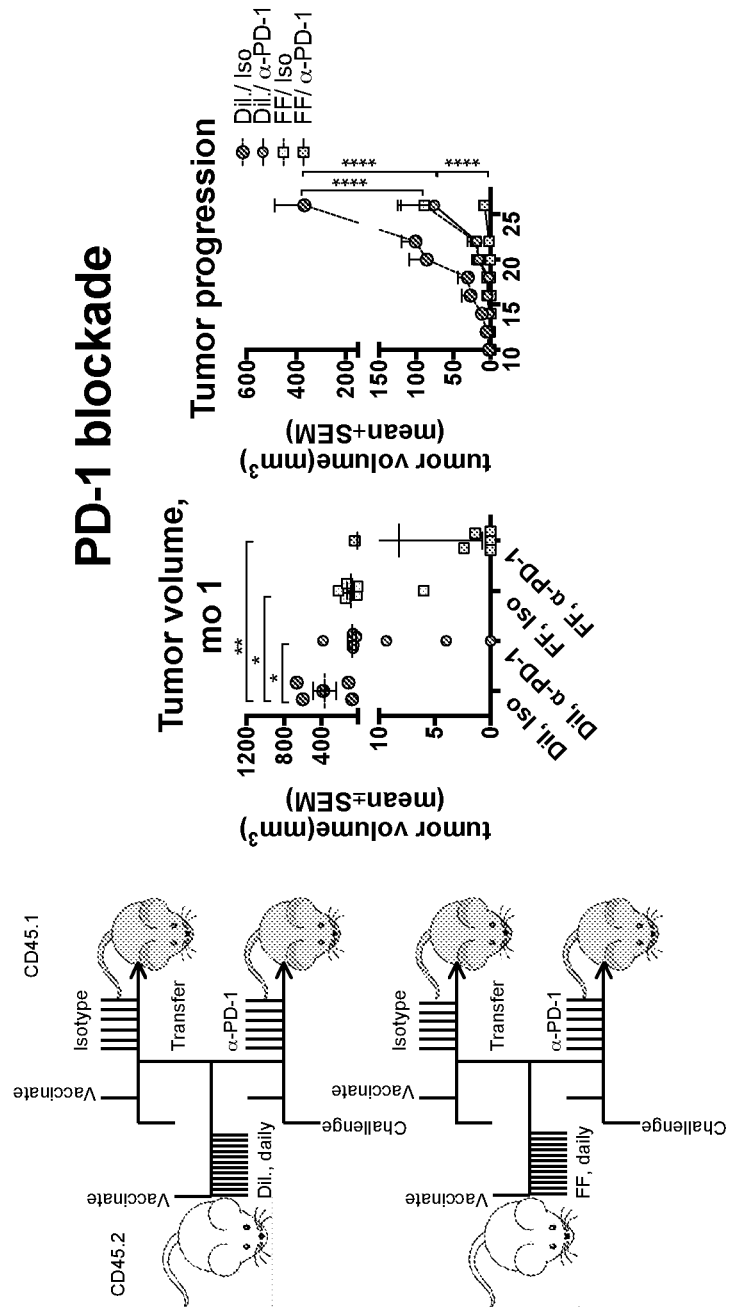
FIG. 6 shows a cartoon and two graphs supporting that PD-1 blockade acts synergistically with FF pre-treatment.

The methods and compositions disclosed herein relate to the ability to "switch" the metabolism of T cells from the use of glucose and glycolysis to obtain energy to the use of fatty acid catabolism for direct or adjunctive treatment of cancer. The methods and compositions discussed herein involve pretreatment of a T cell or T cell ex vivo or in vitro with fenofibric acid (FFA), an FFA prodrug, or a derivative thereof that has PPAR-α agonist activity. FFA and certain prodrugs and derivatives demonstrate the ability to enhance biomass production by activated T cells as well as providing a switch to fatty acid catabolism.

As previously discussed and described in International publication patent application No. WO2017/123911, published Jul. 20, 2017, and incorporated herein by reference, the inventor's described the use or supplemental use of metabolic interventions, i.e., drugs, compounds or reagents, that promote fatty acid catabolism by adoptively transferred or vaccine-induced CD8+T cells to improve the efficacy of cancer immunotherapy. Specifically, the aforementioned application determined that: Metabolic stress within the TME decreases functions of tumor-infiltrating CD8+TILs, leading to CD8+TIL exhaustion independent of their antigen-specificity. Low $O_2$ and glucose were found to reprogram CD8+TILs to enhance fatty acid catabolism to preserve function. Additionally, promoting fatty acid catabolism of CD8+TILs with the compound fenofibrate improved their ability to combat tumors. Evidence provided in the above-noted application supported that PD-1 blockade synergizes with fenofibrate in increasing the efficacy of melanoma immunotherapy.

Specifically, as described therein, the inventors showed, using mouse melanoma models and human melanoma samples, that CD8+TILs experiencing double metabolic jeopardy enhance PPAR-α signaling and fatty acid (FA) catabolism to preserve energy production and effector functions. Promoting FA catabolism with fenofibrate markedly improves their capacity to delay tumor growth. It synergizes with PD-1 blockade to efficiently boost the efficacy of melanoma. While blockade of PD-1 signaling also reduces or delays tumor progression, it fails to affect vaccine-induced CD8+TIL functions or metabolism. PD-1 blockade (i.e., anti-PD-1 treatment) acts synergistically with metabolic reprogramming of T cells, particularly TILs, to achieve superior antitumor efficacy. Thus, the methods and compositions provided therein used metabolic interventions to improve the efficacy of cancer immunotherapy.

The methods and compositions provided herein offer additional therapeutic interventions in method and compositions involving pretreatment of T cells in vitro or ex vivo with FFA, an FFA prodrug, or a derivative thereof that has PPAR-α agonist activity. In one embodiment, these compounds enhance the recovery of activated T cells in vitro in contrast with other PPAR-α agonists. Without wishing to be bound by theory, the inventor posits that the enhanced T cell recovery resulting from pretreatment or conditioning with FFA, an FFA prodrug, or related derivatives (in comparison with other PPAR-α agonists) is due to the fact that FFA, an FFA prodrug and useful derivatives do not target or inhibit complex I of the electron transport chain. Evidence for this is provided by observation that FFA does not cross mitochondrial membranes to access the electron transport chain complex I targets, while fenofibrate does. However, FFA promotes the use of fatty acid catabolism rather than glucose for energy and promotes biomass production by the pre-treated T cells. Such pre-treated cells are useful for treating cancer.

Further methods involve administering a tumor-specific vaccine composition with the pretreated T cells. All possible methods that take advantage of switching the energy production metabolism of the T cells can optionally be coupled with checkpoint inhibition, such as PD-1 blockade.

Certain components and definitions used in the description of these methods and compositions are defined below.

"Patient" or "subject" as used herein means a mammalian animal, including a human, a veterinary or farm animal, a domestic animal or pet, and animals normally used for clinical research. More specifically, the subject of these methods and compositions is a human.

As used herein, the term "T cell(s)" or "T cell population" mean any human or mammalian T cell(s). In one embodiment, the T cell or populated is activated. In one embodiment, the T cell is an autologous or heterologous, naturally occurring T cell. In another embodiment, the T cell is a recombinantly or synthetically modified T cell construct. In some embodiments, the T cell to be pretreated is a primary T cell, a CD8 (cytotoxic) T cell, a CD8 (cytotoxic) T cell, a T infiltrating lymphocyte (TIL), an NK T cell or another T cell. In one embodiment, the T cell is obtained from the peripheral blood, TME or other fluid of the same mammalian subject into whom the T cell which is pre-treated or conditioned by the methods described herein is to be administered. In another embodiment, the T cell to be pretreated is primary T cell, a CD8 (cytotoxic) T cell, or an NK T cell or other T cell obtained from a bone marrow transplant match for the subject. Other suitable T cells include T cells obtained from resected tumors, a polyclonal or monoclonal tumor-reactive T cell. In one embodiment, the T cells are obtained by apheresis. In still other embodiments, the T cell is modified recombinantly or synthetically to express a heterologous antigen receptor. In one embodiment, the T cell is expresses a chimeric antigen receptor (CAR) or a chimeric endocrine receptor (CER). Such CARs or CERs are described in e.g., Sadelain, M et al, "The basic principles of chimeric antigen receptor (CAR) design" 2013 April, Cancer Discov. 3(4): 388-398; International Patent Application Publications WO2013/044255 and WO2016/054153, US patent application publication No. US 2013/0287748, and other publications directed to the use of such chimeric constructs. These publications are incorporated by reference to provide information concerning various components useful in the design of some of the constructs described herein. Such CAR or CER T cells are genetically modified lymphocytes expressing a ligand that allows them to recognize an antigen of choice. Upon antigen recognition, these modified T cells are activated via signaling domains converting these T cells into potent cell killers. An advantage over endogenous T cells is that they are not MHC restricted, which allows these T cells to overcome an immune surveillance evasion tactic used in many tumor cells by reducing MHC expression. In still other embodiment, the T cell for pretreatment is an endogenous or heterologous human T cell or human T cell line. Any T cell may be subjected to pretreatment ex vivo with a selected compound or reagent that does not cross mitochondrial membranes, but promotes the use of fatty acid catabolism rather than glucose for energy and promotes biomass production by the pre-treated T cells to "switch" the cell's metabolic function from glycolysis to FA catabolism for the purposes of the methods and compositions provided herein.

As used herein the term "cancer" refers to or describes the physiological condition in mammals that is typically characterized by unregulated cell growth. More specifically, as used herein, the term "cancer" means any cancer characterized by the presence of a solid tumor. Suitable cancers for treatment by the methods described herein, include, without limitation, melanoma, breast cancer, brain cancer, colon/rectal cancer, lung cancer, ovarian cancer, adrenal cancer, anal cancer, bile duct cancer, bladder cancer, bone cancer, endometrial cancer, esophagus cancer, eye cancer, kidney cancer, laryngeal cancer, liver cancer, head and neck cancer, nasopharyngeal cancer, osteosarcoma, oral cancer, ovarian cancer, pancreatic cancer, prostate cancer, rhabdomyosarcoma, salivary gland cancer, stomach cancer, testicular cancer, thyroid cancer, vaginal cancer, lung cancer, and neuroendocrine cancer.

The term "tumor," as used herein, refers to all neoplastic cell growth and proliferation, whether malignant or benign, and all pre-cancerous and cancerous cells and tissues. In one embodiment, the tumor targeted by the methods is characterized by hypoxia, significant infiltration with T lymphocytes, and low glucose in the tumor microenvironment.

As used herein, the compound or reagent useful in the methods and compositions described herein is fenofibric acid (FFA), an FFA prodrug, or a derivative thereof that has PPAR-α agonist activity. Thus, in one embodiment, the FFA, an FFA prodrug, or derivative used for pre-treatment has PPAR-α agonist activity and does not target the electron transport chain complex I. In another embodiment, the FFA, an FFA prodrug, or derivative used for pre-treatment has PPAR-α agonist activity and enhances recovery of activated T cells in vitro. In another embodiment, the FFA, an FFA prodrug, or derivative used for pre-treatment has PPAR-α agonist activity and does not display toxicity for pretreated activated T cells in vitro. In another embodiment, the FFA, an FFA prodrug, or derivative used for pre-treatment has PPAR-α agonist activity and displays limited toxicity for pretreated activated T cells in vitro, in comparison to fenofibrate. In still another embodiment, the FFA, an FFA prodrug, or derivative used for pre-treatment has PPAR-α agonist activity and does not cross the mitochondrial membrane. In various other embodiments, the FFA, an FFA prodrug, and/or derivatives have a combination of these characteristics. FFA, an FFA prodrug, and derivatives that mimic FFA, promote the use of fatty acid catabolism rather than glucose for energy. FFA also promotes biomass production by the pre-treated T cells.

Figure 14:
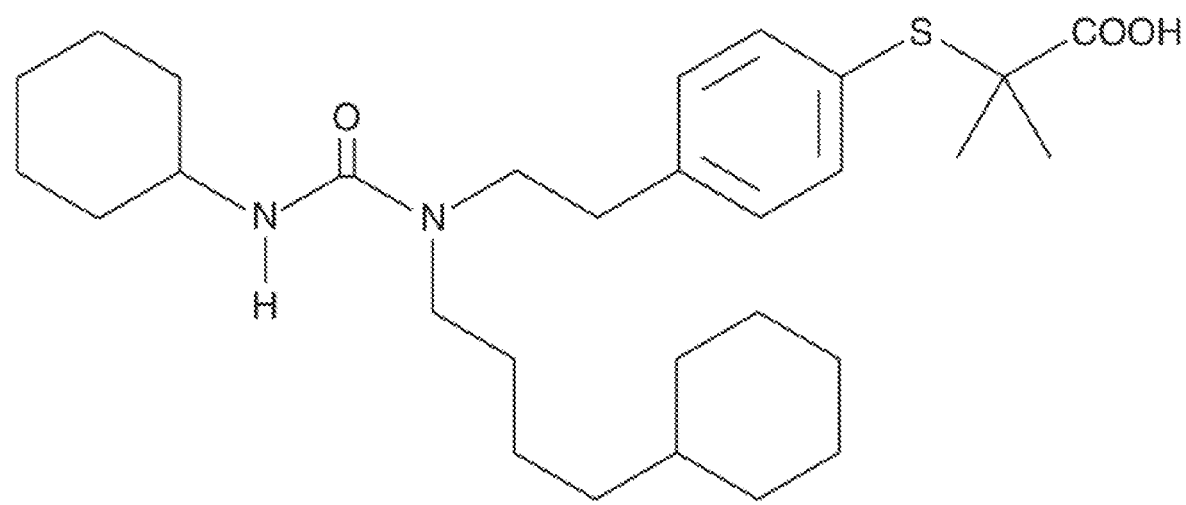
FIG. 14 illustrates the molecular structure of a PPAR-α agonist GW7647 CAS No. 265129-71-3 (Cayman Chemical).
Figure 15:
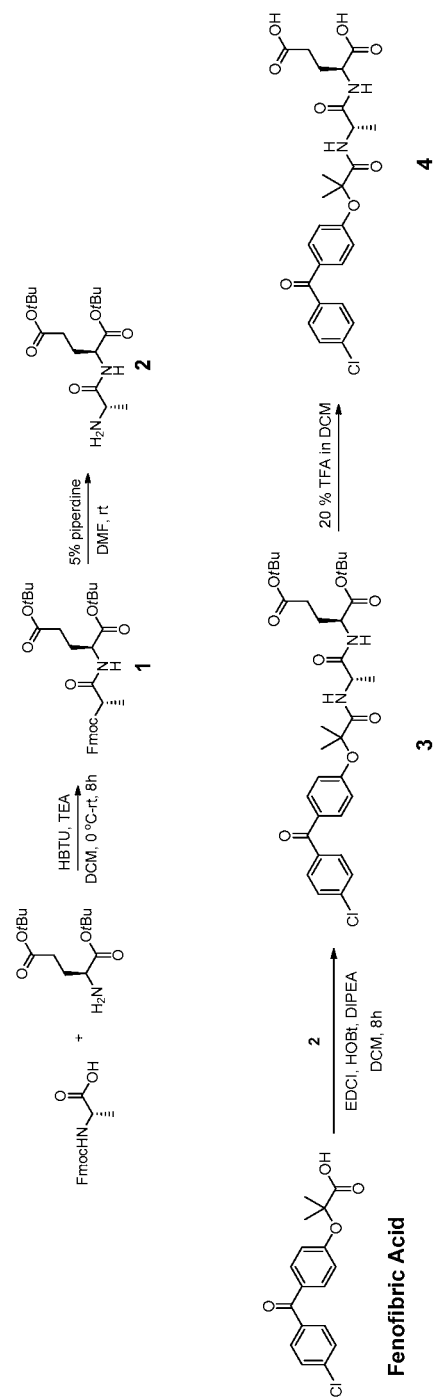
FIG. 15 illustrates the molecular structure of fenofibric acid (FFA) and the synthesis scheme for novel FFA prodrug Compound 4 (FFP).

In another embodiment, the compound useful in these methods is the novel FFA prodrug or derivative, (S)-2-((S)-2-(2-(4-(4-chlorobenzoyl)phenoxy)-2-methylpropanamido)propanamido) pentanedioic acid (also known as FFP or Compound 4). This novel compound and its synthetic production scheme are illustrated in FIG. 14 and FIG. 15. In another embodiment, a compound useful in the methods described herein is GW7647 (2-(4-(2-(1-Cyclohexanebutyl)-3-cyclohexylureido)-ethyl)-phenyl-thio)-2-methyl-propionic acid), which also has PPAR-α agonist activity and does not affect cellular respiration of the cells pretreated with it.

Figure 16:
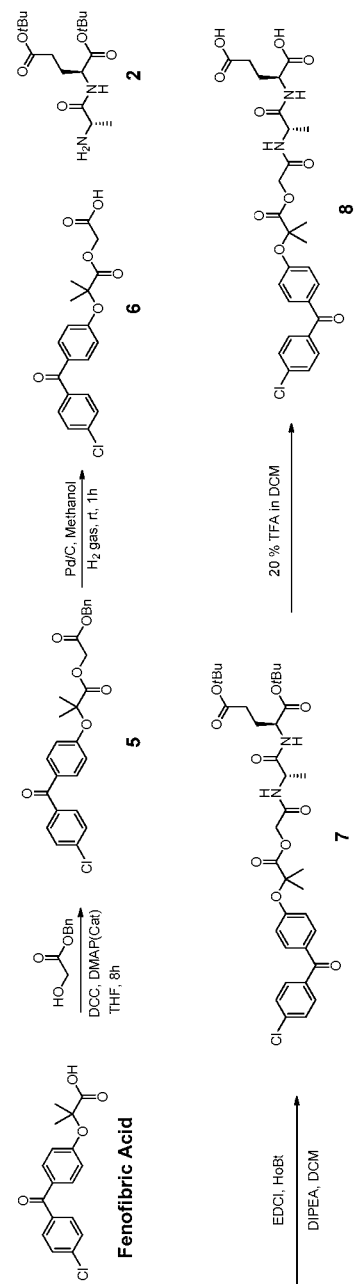
FIG. 16 illustrates the synthesis scheme for novel FFA prodrug Compound 8.

In another embodiment, the compound useful in these methods is the novel FFA prodrug or derivative, (S)-2-((S)-2-(2-(2-(4-(4-chlorobenzoyl)phenoxy)-2-methyl propanoyloxy)acetamido)propanamido) pentanedioic acid (Compound 8). This novel compound and its synthetic production scheme are illustrated in FIG. 16.

Figure 7:
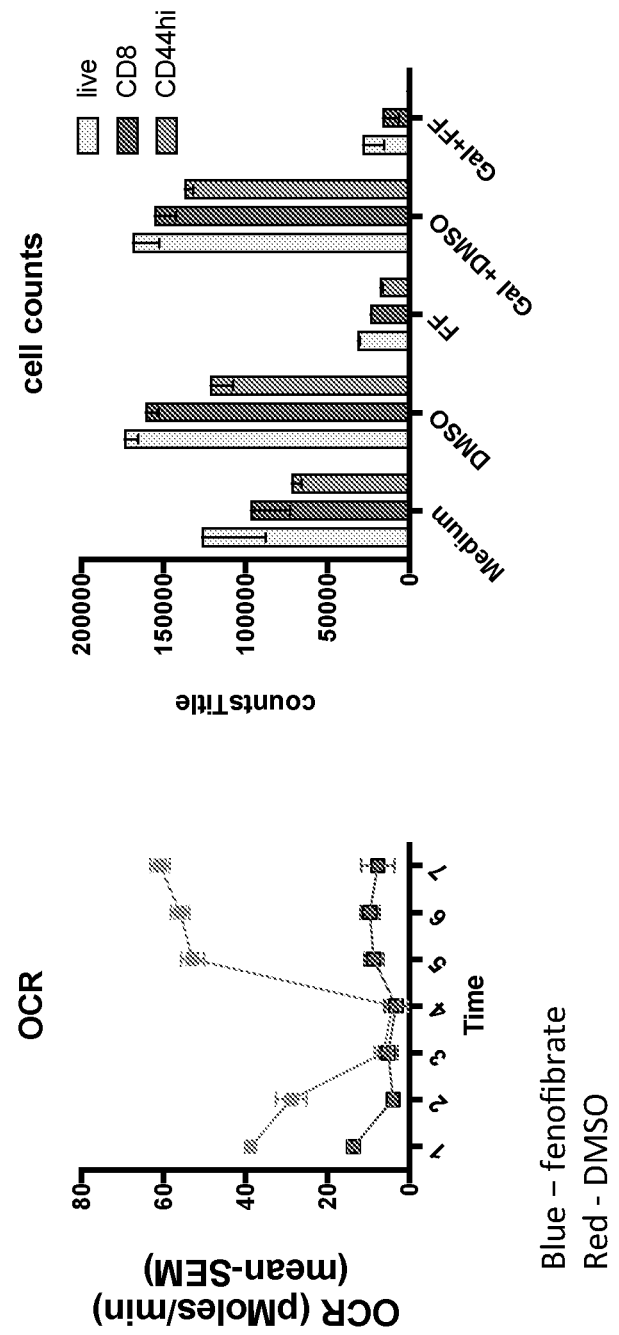
FIG. 7 shows two graphs providing the results from the following protocol: CD8+ T cells from OT-1 mice were stimulated in vitro with their cognate antigen (SIINFEKL peptide) in glucose or galactose medium for 4 days were treated for 2 days with 50 µM of fenofibrate (FF) or the diluent DMSO. They were then analyzed for oxygen consumption rates (OCR) by Seahorse (left graph). In addition, after culture all live cells, CD8+ cells and activated CD44+ CD8+ cells were counted to assess potential toxicity.

In one embodiment, the compound or reagent used for pre-treatment has PPAR-α agonist activity and does not inhibit complex I of the electron transport chain. As shown in FIG. 7, fenofibrate is believed to inhibit complex I. In another embodiment, the FFA, prodrug, or derivative used for pre-treatment has limited toxicity for activated T cells in vitro. In another embodiment, the FFP (Compound 4) or a derivative used for pre-treatment enhances recovery of, or has limited toxicity for, activated T cells in vitro. In another embodiment, the GW7647 or its derivative used for pre-treatment has a limited toxicity for activated T cells in vitro. In another embodiment, the Compound 8 prodrug or derivative is anticipated to similarly display limited toxicity for activated T cells in vitro. In another embodiment, prodrugs or derivatives of other known PPAR-α agonists may be used in these methods if they demonstrate no targeting of electron transport complex I and have limited toxicity for activated T cells in vitro.

Figure 8:
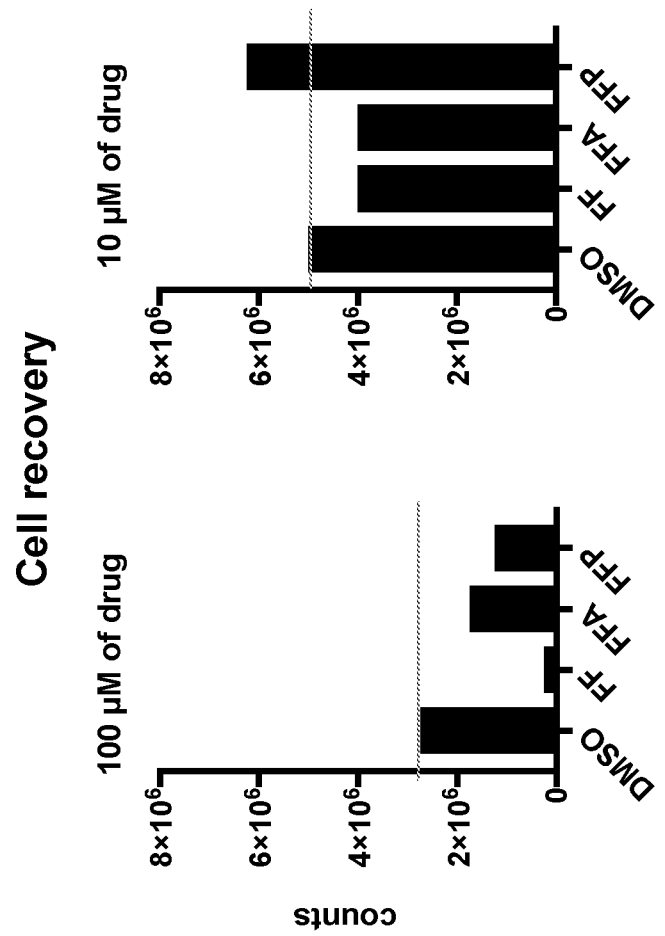
FIG. 8 shows two graphs indicating the results of the following protocol: CD8+ T cells from OT-1 mice were stimulated as in FIG. 7. They were then treated for 2 days with 10 or 100 μM of fenofibrate (FF), fenofibric acid (FFA) or a modified fenofibric acid (FFP). Cell recovery was assessed. Thus, in pretreatment of cells in vitro fenofibric acid displays a significant ability to increase biomass or recovery of the cells.
Figure 9:
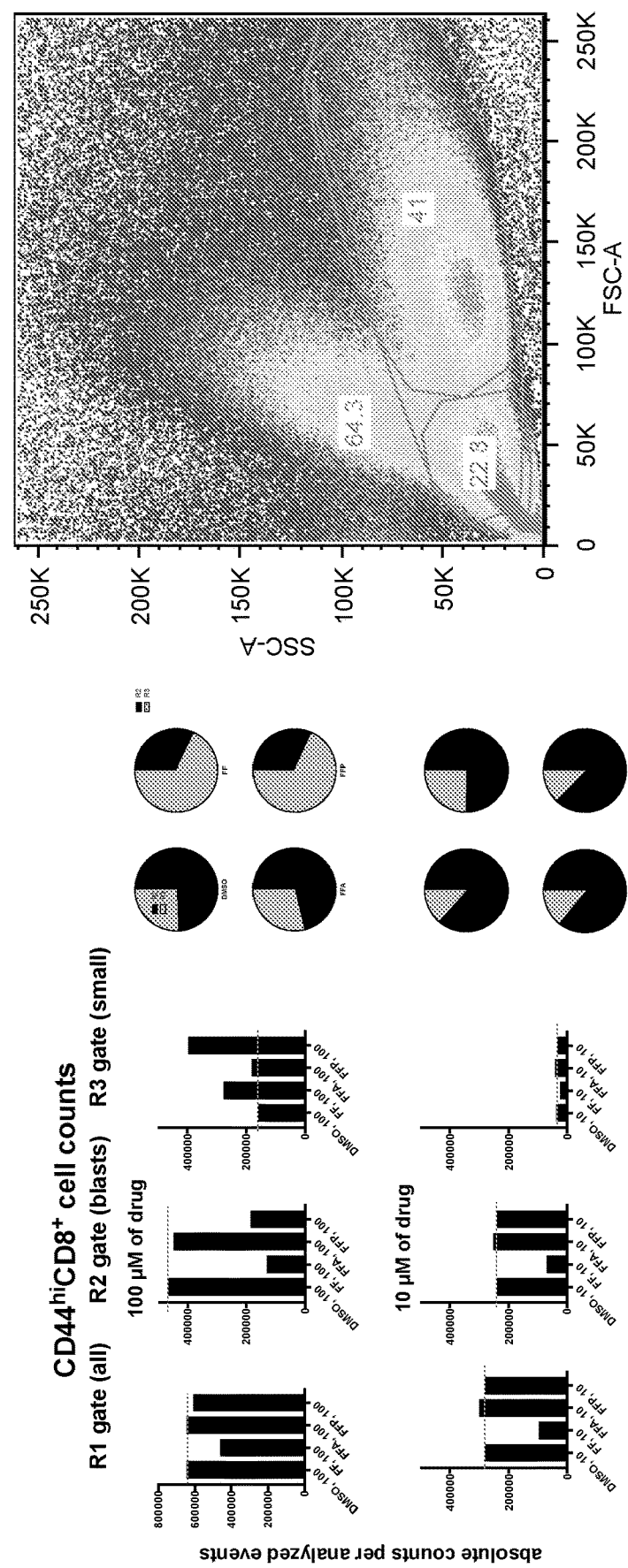
FIG. 9 provides graphs and data showing that the same cells described in FIG. 8 were tested for their scatter by flow cytometry to assess blast formation. Fenofibric acid does not block blast formation.

In one embodiment, the terms "enhanced recovery" or "limited toxicity" refer to the increased recovery of pretreated cells in vitro in comparison to cells pretreated with fenofibrate in vitro. In one embodiment, as shown in FIG. 8, these terms mean that at a dosage of 100 µM of each drug, the compound permits more than 40% greater recovery of cells per count that fenofibrate in vitro pretreated cells. In one embodiment, these compounds and reagents which are useful for the in vitro and ex vivo pre-treatment of T cells include fenofibric acid. In one embodiment, PPAR-α agonists that do not inhibit complex I of the electron transport chain and/or cross the mitochondrial membrane, display enhanced recovery of pretreated cells in vitro. Such other PPAR-α agonists that are shown not to inhibit complex I of the electron transport chain, can also be used in certain embodiments of these methods and compositions. In one embodiment, derivatives of PPAR-α agonist compounds, e.g., various acids and salts, or prodrugs of clofibrate, gemfibrozil, ciprofibrate, bezafibrate or an AMPK activator, such as 5-aminoimidazole-4-carboxamide riboside, that are found to not target the electron transport chain complex I are anticipated to be similarly useful and be characterized by enhanced cell recovery in the described in vitro pretreatment methods. Other compounds, small molecule compounds or peptides, proteins or polypeptides that mimic the activity of FFA are anticipated to be useful in these methods.

As used herein, the term "checkpoint inhibitor" refers to a composition or composition in the form of an antibody or a small molecule that binds or inhibits various checkpoint proteins. Such checkpoint proteins, including, without limitation, PD-1, PD-L1, CTLA-4, BTLA and CD160. As examples, known checkpoint inhibitors include the antibodies ipilimumab (Yervoy®), pembrolizumab (Keytruda®), and nivolumab (Opdivo®), among others. Other checkpoint inhibitors developed as small molecules or other checkpoint binding antibodies or antibody fragments are included in this definition.

As used herein, the term "antibody" refers to all types of immunoglobulins, including IgG, IgM, IgA, IgD, and IgE, including antibody fragments. The antibody can be monoclonal or polyclonal and can be of any species of origin, including (for example) mouse, rat, rabbit, horse, goat, sheep, camel, or human, or can be a chimeric antibody. See, e.g., Walker et al., Molec. Immunol. 26:403 (1989). The antibodies can be recombinant monoclonal antibodies produced according to known methods, see, e.g., U.S. Pat. Nos. 4,474,893 or 4,816,567, which are incorporated herein by reference. The antibodies can also be chemically constructed according to known methods, e.g., U.S. Pat. No. 4,676,980 which is incorporated herein by reference. See also, U.S. Pat. No. 8,613,922, which is incorporated herein by reference. Antibody fragments are antigen binding fragments which include, for example, Fab, Fab', F(ab')2, and Fv fragments; domain antibodies, bifunctional, diabodies; vaccibodies, linear antibodies; single-chain antibody molecules (scFV); heavy chain or light chain complementarity determining regions, and multispecific antibodies formed from antibody fragments. Such antigen-binding fragments can be produced by known techniques.

By "therapeutic reagent" or "regimen" is meant any type of treatment employed in the treatment of cancers with or without solid tumors, including, without limitation, chemotherapeutic pharmaceuticals, biological response modifiers, radiation, diet, vitamin therapy, hormone therapies, gene therapy, surgical resection, etc.

By "an immunotherapeutic composition targeting an antigen or ligand on the tumor cell" is meant any composition including cancer vaccines that target a cancer antigen in order to stimulate the subject's immune system. Such immunotherapeutic compositions are designed to elicit a humoral (e.g., antibody) or cellular (e.g., a cytotoxic T cell or T helper) response, or, in one embodiment, an innate immune response, is mounted to a target gene product delivered by the immunogenic composition following delivery to a mammal or animal subject. In one embodiment, immunotherapeutic compositions useful in these methods involve presentation of the antigen to the subject's immune system via virus vectors, e.g., adenovirus, adeno-associated virus, lentivirus, retrovirus, poxvirus or others, or via virus-like particles (VLP). In another embodiment, the immunotherapeutic composition used in the methods described herein is a DNA or RNA construct that expresses a cancer antigen. In another embodiment, the immunotherapeutic composition used in the methods described herein is a composition comprising cancer antigens or fragments thereof as peptides or proteins. In another embodiment, the immunotherapeutic composition used in the methods described herein is a monoclonal antibody or antigen-binding fragment(s) that specifically bind cancer antigens. The compositions are those that are created using known recombinant and synthetic techniques. See, e.g., reference in the examples to an exemplary melanoma immunotherapeutic composition, AdC68-gDMelapoly described in detail in U.S. Pat. No. 9,402,888 and in FIG. 7 thereof. Many immunotherapeutic cancer "vaccines" are known and described in the art that can be used in the methods described herein.

By "antigen or ligand on the tumor cell" is meant a full-length, wild-type tumor-specific antigen or mutated tumor-specific antigens or tumor-associated antigens. Tumor-specific antigens are those epitopes and proteins found on a selected specific cancer or tumor cell, and not on all cancer cells. Cancer-associated antigens are antigens that may be associated with more than one cancer or tumor cell type. Exemplary cancer-specific antigens can include, without limitation, 707-AP, alpha (a)-fetoprotein, ART-4, BAGE; b-catenin/m, b-catenin/mutated Bacabal, CAMEL, CAP-1, mCASP-8, CDC27m, CDK4/m, CEA, CT, Cuyp-B, MAGE-B2, MAGE-B1, ELF2M, ETV6-AML1, G250, GAGE, GnT-V, Gp100, HAGE, HER-2/neu , HPV-E7, HSP70-2M HST-2, hTERT, iCE , KIAA0205, LAGE, LDLR/FUT, MAGE , MART-1, MC1R, MUC1, MUM-1, -2, -3, P15, p190 minor bcr-abl. Still other suitable tumor or cancer genes encode VEGFR1, VEGFR2, MAGE-A1, MUC-1, Thymosin β1, EGFR, Her-2/neu, MAGE-3, Survivin, Heparinase 1, Heparinase 2, and CEA, among others. Still other suitable antigens are those listed in the references, and incorporated by reference herein. See, also, texts identifying suitable antigens, such as Scott and Renner, in Encyclopedia of life Sciences 2001 Eds., John Wiley & Sons, Ltd.

By "vector" is meant an entity that delivers a heterologous molecule to cells, either for therapeutic or vaccine purposes. As used herein, a vector may include any genetic element including, without limitation, naked DNA, a phage, transposon, cosmid, episome, plasmid, or a virus or bacterium. Vectors are generated using the techniques and sequences provided herein, described in the examples, and in conjunction with techniques known to those of skill in the art. Such techniques include conventional cloning techniques of cDNA such as those described in texts such as Green and Sambrook, Molecular Cloning: A Laboratory Manual. 4$^{th}$ Edit, Cold Spring Harbor Laboratory Press, 2012, use of overlapping oligonucleotide sequences of the *Salmonella* genomes, polymerase chain reaction, and any suitable method which provides the desired nucleotide sequence.

By "administering" or "route of administration" is meant delivery of the pre-treated T cells, immunotherapeutic composition, or the checkpoint inhibitor used in the methods herein, to the subject. As discussed in detail below, these methods can be independent for each components of the method. Each administration method can occur with or without a pharmaceutical carrier or excipient, or with or without another chemotherapeutic agent into the TME of the subject. Conventional and pharmaceutically acceptable routes of administration include, but are not limited to, systemic routes, such as intraperitoneal, intravenous, intranasal, intravenous, intramuscular, intratracheal, subcutaneous, and other parenteral routes of administration or intratumoral or intranodal administration. In one embodiment, the route of administration is oral. In another embodiment, the route of administration is intraperitoneal. In another embodiment, the route of administration is intravascular. Routes of administration may be combined, if desired. In some embodiments, the administration is repeated periodically, as discussed in detail below.

In the context of the compositions and methods described herein, reference to "one or more," "at least five," etc. of the compositions, compounds or reagents listed means any one or all combinations of the compositions, reagents or compounds listed.

The words "comprise", "comprises", and "comprising" are to be interpreted inclusively rather than exclusively, i.e., to include other unspecified components or process steps. The words "consist", "consisting", and its variants, are to be interpreted exclusively, rather than inclusively, i.e., to exclude components or steps not specifically recited.

As used herein, the term "about" means a variability of 10% from the reference given, unless otherwise specified.

It is to be noted that the term "a" or "an", refers to one or more, for example, "an antibody," is understood to represent one or more antibodies. As such, the terms "a" (or "an"), "one or more," and "at least one" are used interchangeably herein.

Unless defined otherwise in this specification, technical and scientific terms used herein have the same meaning as commonly understood by one of ordinary skill in the art to which this invention belongs and by reference to published texts, which provide one skilled in the art with a general guide to many of the terms used in the present application.

In one aspect of this invention, a composition for adoptive transfer to a mammalian subject comprises a T cell or T cell population that has been pretreated ex vivo or in vitro with fenofibric acid (FFA), an FFA prodrug or a derivative thereof that has PPAR-α agonist activity. In one embodiment, the pretreating compound enhances recovery of the pretreated T cells in vitro. In one embodiment, the pretreating compound does not inhibit or target complex I of the electron transport chain. In one embodiment, the pretreating compound or reagent is fenofibric acid. In another embodiment, the pretreating compound or reagent is FFP or Compound 4. In another embodiment, the pretreating compound or reagent is Compound 8. See, e.g., FIGS. 8-16. Theoretically, such compounds do not target complex I, and do not cross the mitochondrial membrane. As shown in the data provided herein, fenofibric acid when used in vitro behaves similarly to fenofibrate in vivo, but demonstrates enhanced growth effects or biomass, and reduced toxicity in the in vitro or ex vivo pretreatment of the T cells (see particularly FIG. 8). It is anticipated that other metabolic "switching" compounds and reagents that do not inhibit complex I will be useful in the same manner.

These compositions may employ as the T cells for such pre-treatment an autologous or heterologous, naturally occurring T cell or a recombinantly or synthetically modified T cell construct. The T cell or population may be a human T cell or natural killer (NK) T cell or T infiltrating lymphocyte (TIL) obtained from the subject or from a bone marrow transplant match for the subject. In still other embodiments the T cell or population is obtained from human peripheral blood or from the tumor microenvironment of the subject. In still other embodiments, the T cell is modified to express a heterologous antigen receptor, or a chimeric antigen receptor (CAR-T) or a chimeric endocrine receptor (CER-T) prior to said pretreatment. In still other embodiments, the T cell or population slated for pretreatment is an endogenous or heterologous human T cell or human T cell line. In yet other embodiments, the T cell is a TIL or a CD8+ T cell. These compositions are prepared for adoptive transfer for the treatment of cancer, with or without an accompanying checkpoint inhibitor or tumor antigen specific immunological composition or vaccine.

In one embodiment of the methods described herein, a method for treating cancer comprises administering to a subject having a cancer characterized by a solid tumor an immunotherapeutic composition targeting an antigen or ligand on the tumor cell; and a selected T cell, e.g., a tumor antigen-specific T cell or CAR, etc, pretreated ex vivo with a fenofibric acid (FFA), FFA prodrug, or a derivative thereof that has PPAR-α agonist. In one embodiment, these compounds do not cross mitochondrial membranes. In one embodiment, these compounds do not target complex I. In one embodiment, these compounds promote the use of fatty acid catabolism rather than glucose for energy and promote biomass production by the pre-treated T cells. These pre-treated T cells can then be used for adoptive cell transfer.

In still another embodiment of the methods described herein, a method for treating cancer comprises administering to a subject having a cancer a composition comprising such a T cell pretreated ex vivo or in vitro as described herein. The T cells for such pre-treatment are selected from the list of T cells identified above.

By "pre-treatment" or "conditioning" with the selected compound, e.g., FFA, an FFA prodrug, or a derivative thereof, is meant that the selected T cell is cultured and expanded in the presence of the selected compound, e.g., fenofibric acid, FFP or Compound 4, at between about 1 to about 500 μM, for the entire or a fraction of the time of T cell expansion to condition the T cell to use fatty acids rather than glucose for energy production and to increase biomass. In one embodiment a suitable concentration of the FFA, prodrug or derivative (or similar compound as described herein) is at least 1, 5, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, to at least about 500 μM. Similarly, intervening concentration between any two numbers listed is encompassed in the term "suitable concentration. The time of T cell expansion in one embodiment means the entire time of in vitro culture, which can span several hours to at least several days. In another embodiment, the time of T cell expansion is minimally 24 hours of in vitro culture. Other time periods for pre-treatment with the FFA, prodrug or derivative may be at least 1, 5, 10, 15, or 20 or more hours, or any intervening times between any specified number of hours stated herein. The pretreated T cells are then administered to the subject by well-known adaptive cell transfer techniques.

In one embodiment, the pretreated T cells are administered to treat cancer as a single therapy. In another embodiment, this method involves co-administering the immunotherapeutic compositions with the pretreated T cell. In still other embodiments, the method can also include administering a checkpoint inhibitor in the form of an antibody or a small molecule either simultaneously with or sequentially with the pretreated cells and/or the immunotherapeutic composition.

In still another variation of the method for treating cancer, the co-administration includes the immunotherapeutic composition, the FFA, prodrug or derivative (i.e., administered as a compound) and the selected pretreated T cells identified herein. In another embodiment, this method also involves co-administering a checkpoint inhibitor in the form of an antibody or a small molecule.

In any of the methods described herein, the immunotherapeutic composition and the FFA, prodrug or derivative, or the immunotherapeutic composition and the pretreated T cell are administered substantially simultaneously. In another embodiment, the immunotherapeutic composition and the FFA, prodrug or derivative compound, or the immunotherapeutic composition and the pretreated T cell are administered sequentially by the same or different routes of administration. The routes of administration selected depend upon the nature of the compositions. For example, for FFA, prodrug or another small chemical molecule derivative, such molecules may be administered orally in doses known and accepted for other pharmaceutical uses of these drugs. In one embodiment, the immunotherapeutic composition and FFA, prodrug or derivative are independently administered systemically by intramuscular, intraperitoneal, intravenous, intratumoral or intranodal administration. In other administration protocols, the FFA, prodrug or derivative compound or the pretreated T cells are administered once or repeatedly from at least one to 14 days. In some protocols, the administration occurs one to 14 days after administration of the immunotherapeutic composition. In certain embodiments, the immunotherapeutic composition is administered in a single dose. In other embodiments, the immunotherapeutic composition is administered as a booster dose.

In still further aspects of these methods, the subject may be treated with other anti-cancer therapies before, during or after treatment with the pre-treated T cells alone or with the combination of the immunotherapeutic compositions and pre-treated cells. Such treatment may be concurrent or simultaneous or overlap treatment with the modified T cell adoptive transfer and/or the checkpoint inhibitors. In one embodiment, the methods involve treating the subject with chemotherapy before administering the immunotherapeutic composition and/or pretreated T cells. In still another embodiment, the method further comprises depleting the subject of lymphocytes and optionally surgically resecting the tumor prior to adoptive transfer of the selected T cells pretreated ex vivo with FFA, an FFA prodrug or a derivative to condition the T cell to use fatty acids rather than glucose for energy production.

In some embodiments, the pretreated cells are administered in a single dose, followed by optional administration of a checkpoint inhibitor. These doses may be repeated. In yet other embodiments of the methods, the immunotherapeutic composition is administered in a single dose without any booster, followed by administration of at least one of the selected pre-treated T cells, and/or the checkpoint inhibitors.

In yet another embodiment, the immunotherapeutic composition is re-administered as a booster dose following administration of the selected pre-treated T cells, and/or the checkpoint inhibitors.

Any of these therapeutic compositions and components of the methods may be administered to a patient, preferably suspended in a biologically compatible solution or pharmaceutically acceptable delivery vehicle. The various components of the methods are prepared for administration by being suspended or dissolved in a pharmaceutically or physiologically acceptable carrier such as isotonic saline; isotonic salts solution or other formulations that will be apparent to those skilled in such administration. The appropriate carrier will be evident to those skilled in the art and will depend in large part upon the route of administration. Other aqueous and non-aqueous isotonic sterile injection solutions and aqueous and non-aqueous sterile suspensions known to be pharmaceutically acceptable carriers and well known to those of skill in the art may be employed for this purpose.

Dosages of these therapeutic compositions will depend primarily on factors such as type of composition (i.e., selected pre-treated T cells, vectors, nucleic acid constructs or proteins) the condition being treated, the age, weight, and health of the patient, and may thus vary among patients. The dosages for administration of the components of the methods are the conventional dosages known to be useful for administering that component. An attending physician may select appropriate dosages using the following as guidelines.

In one embodiment, a useful dosage of a pre-treated T cell is a single-infusion maximum tolerated dose (MTD), which may be determined by dose escalation studies in animal models. In one embodiment, a typical efficacious and non-toxic dose of T cells is between about $2 \times 10^4$ to $5 \times 10^9$ cells per kg/subject body weight. Other doses, such as $10^5$ or $10^6$ or $10^7$ or $10^8$ can be useful. See, the methods for dose determination as described in e.g., WO2016/054153 and in other CAR publications in the art.

In one embodiment, a typical dosage of an immunotherapeutic composition depends upon the nature of the composition. For example, if the composition is delivered in a viral vector, a therapeutically effective adult human or veterinary dosage of a viral vector is generally in the range of from about 100 μL to about 100 mL of a carrier containing concentrations of from about $1 \times 10^6$ to about $1 \times 10^{15}$ particles, about $1 \times 10^{11}$ to $1 \times 10^{13}$ particles, or about $1 \times 10^9$ to $1 \times 10^{12}$ particles virus.

If the composition (e.g., the immunotherapeutic composition or checkpoint inhibitor) is administered as an antibody or other protein, the dosages may range between a unit dosage of between 0.01 mg to 100 mg of protein (which is equivalent to about 12.5 μg/kg body weight). The dosage of the checkpoint inhibitor may be adjusted based on known toxicities of the particular antibody or small molecule used.

If any of the immunotherapeutic composition or the other components of the method is administered as naked DNA, the dosages may range from about 50 μg to about 1 mg of DNA per mL of a sterile solution.

Similarly, the doses of the FFA, prodrug, or derivative compound may be similar to those administered for other uses, e.g., for cholesterol control or hyperlipidemia, of the similar compound. For example, FFA may be administered at dosages of from 40 mg/day to 120 mg/day for adults. In yet another embodiment, a "standard" efficacious and non-toxic dose of pretreated T cells for adoptive transfer is about $10^7$ cells. As another example, the number of adoptively transferred T cells can be optimized by one of skill in the art.

In one embodiment, such a dosage can range from about $10^5$ to about $10^{11}$ cells per kilogram of body weight of the subject. Other dosages are taught in the references recited herein and can be readily adjusted by one of skill in the art depending upon the treatment regimen, physical condition of the patient, type and stage and location of the tumor being treated, and taking into consideration other ancillary chemotherapies being used to treat the patient.

In yet another aspect, a therapeutic regimen is provided for the treatment of cancer comprising administering to a subject having a cancer characterized by a solid tumor a single dose of an immunotherapeutic composition targeting an antigen or ligand on the tumor cell on a day 1 of treatment. In this regimen, the subject is thereafter administered by adoptive transfer the selected T cells pretreated ex vivo with FFA, an FFA prodrug, or a derivative compound to condition the T cell to use fatty acids rather than glucose for energy production and increase biomass without targeting complex I of the electron transport chain. The adoptive transfer of the pre-treated T cells conditioned with the selected compound can occur on any of day 0-14 after administration of the immunotherapeutic composition. Thus, in certain embodiments, the adoptive transfer occurs on day 0, 1, 2, 3, 4, 5, 6, 7, 8, 9, 10, 11, 12, 13 or day 14 or even later than day 14, after immunotherapeutic composition administration. Other dates may be selected depending upon how long the immunotherapeutic composition is expressed in vivo. This expression depends upon the type of vaccine and thus the timing of co-administration in the therapeutic regimen may be adjusted by one of skill in the art. The checkpoint inhibitors may be administered at the same time or following the administration of the pre-treated T cells.

In yet another embodiment, a related method permits enhancing the survival of a chimeric antigen receptor-T cell or a chimeric endocrine receptor-T cell or ex vivo expanded tumor antigen-specific T cells, such as those described[41] and in e.g., International patent application publication No. WO2012/079000 and International patent application No. PCT/US2015/053128, each incorporated by reference. In one embodiment, the pretreated T cell is obtained from peripheral blood and modified to express a chimeric antigen receptor or a chimeric endocrine receptor and pretreated ex vivo with the FFA, FFA prodrug, or derivative compound or reagent. The pretreated T cell is an endogenous or heterologous human T cell or human T cell line. The pretreated T cell is a CD8+ T cell. In this method, the T cell(s) are pretreated ex vivo with a FFA, an FFA prodrug, or a derivative that promotes the use of fatty acid catabolism for energy production by tumor antigen-specific T cells in the tumor microenvironment as discussed above without targeting the electron transport complex I and then administered to the patient having a solid tumor by adoptive cell transfer, as described in the incorporated references.

In recent years blockade of immunological checkpoints has evolved as one of the most promising therapies to enhance tumor antigen-specific immune responses and achieved durable clinical responses in cancer patients. Treatments with immune checkpoint inhibitors partially rescue TIL functions and have yielded promising results in cancer patients.[4] The assumption has been that antibodies, which inhibit signaling through immunoinhibitors, such as programmed cell death protein (PD)-1, preserve functions of T cells that due to chronic antigen stimulation differentiate towards exhaustion. The data provided herein show that continued T cell receptor signaling in vaccine-induced CD8+ tumor infiltrating T cells (TILs) is not the sole factor that drives their exhaustion and functional failure as this fate is also encountered by CD8+ TILs directed to an antigen that is not expressed within the TME. Additional data gained with vaccine-induced TILs in comparison to CD8+ T cells stimulated under various culture conditions in vitro show that TILs experience metabolic stress within a glucose- and oxygen-lacking TME, which becomes increasingly severe during tumor progression.

Overall data presented below and in WO2017/123911, published Jul. 20, 2017, support that fatty acid metabolism is essential for CD8+TILs to preserve their tumoricidal functions within the TME. Additional data using drugs that promote fatty acid oxidization or mice with genetic alteration that affect lipid metabolism furthermore show that tumor antigen-specific CD8+T cells conditioned during activation to use fatty acids rather than glucose for energy production show better preserved functions within the TME and achieve longer delays in tumor progression although they express higher levels of PD-1.

Within the tumor microenvironment vaccine-induced CD8+T cells encounter metabolic stress due to lack of glucose and $O_2$, which results in increased expression of co-inhibitors and loss of functions. CD8+ tumor infiltrating T cells (TILs) react by enhancing catabolism of fatty acids including ketone bodies. Drug-induced increases in fatty acid oxidization further augment expression of the co-inhibitor PD-1 on CD8+TILs but significantly improve the T cells' ability to slow tumor progression.

The inventors determined that lack of Glu and $O_2$ plays a critical role in driving the metabolic reprograming and functional exhaustion of CD8+TILs. They further indicate that metabolic interventions improve the efficacy of cancer immunotherapy.

The following examples are provided for illustration only and the invention should in no way be construed as being limited to these examples but rather should be construed to encompass any and all variations that become evident as a result of the teaching provided herein.

EXAMPLE 1

In International publication patent application No. WO2017/123911, fenofibrate treatment during in vitro stimulation of OT-1 cells was shown to cause metabolic switching of T cell metabolism.

Figure 10:
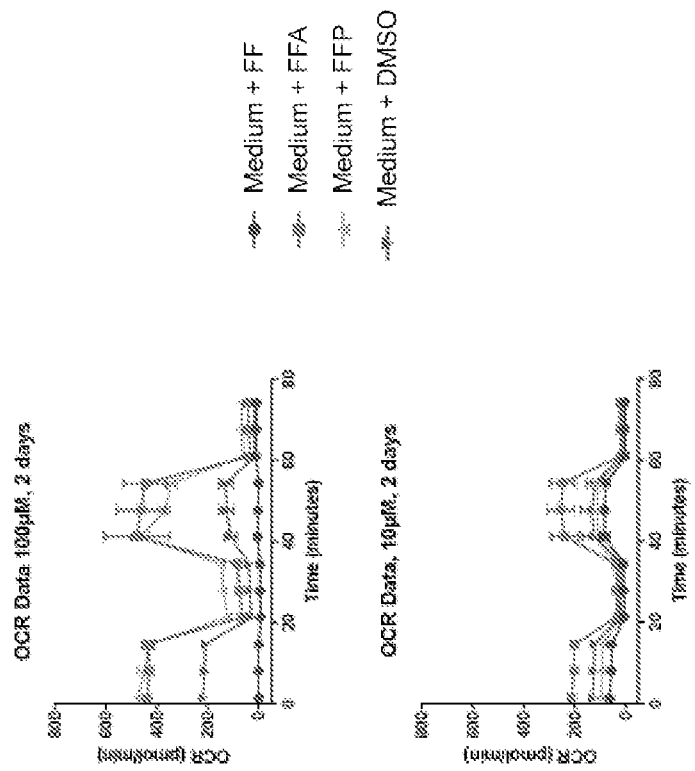
FIG. 10 shows that the same cells described in FIG. 8 were tested for oxygen consumption rates (OCR), which is a measure for energy production through oxidative phosphorylation, and the electron transfer chain by Seahorse. These graphs showing two different dosages of FF, FFA, FFP and DMSO (control) demonstrates that fenofibric acid increases oxygen consumption rates.
Figure 13:
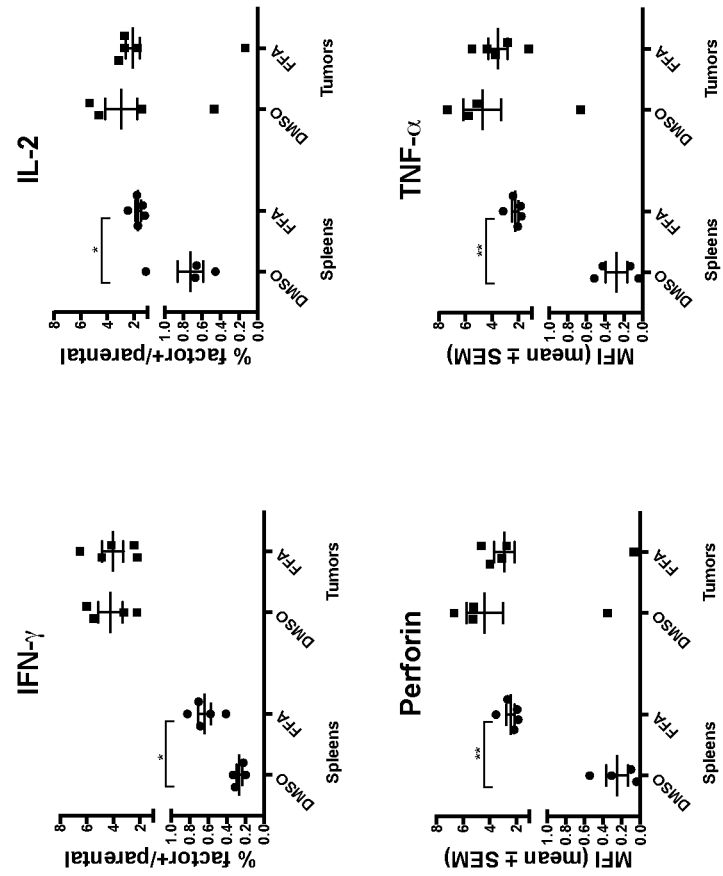
FIG. 13 shows four graphs supporting the effect of fenofibric acid on functions of transferred CD8+ cells. CD8+ T cells from spleens and tumors of the mice described in FIG. 11 were tested for functions upon in vitro stimulation with their cognate antigen (SIINFEKL peptide) or as a control medium for production of effector molecules.

FIGS. 1 to 6 demonstrate some of the observations made with fenofibrate. FIGS. 10 and 13 demonstrate that in similar protocols and studies FFA, which does not target complex I of the electron transport chain, has similar effects when used for in vitro pretreatment of T cells, but demonstrates unexpectedly the advantages of increased biomass and cell survival.

To assess the effect of a T cell or T cell population that was pretreated in vitro with fenofibric acid, an FFA prodrug, or a derivative thereof that promotes the use of fatty acid catabolism rather than glucose for energy production without targeting complex I on tumor growth in vivo, the following experiment was conducted.

Mice were injected with $10^5$ B16.F10 melanoma cells that were transduced to express the immunodominant epitope of ovalbumin SIINFEKL SEQ ID NO: 1. Five days later the mice received either (a) untreated OT-1 CD8+ T cells (i.v.) which express a transgenic T cell receptor for SIINFEKL (naïve OT-1 transfer), (b) OT-1 cells that were stimulated/activated in vitro with the SIINFEKL peptide and pre-treated with diluent (Ctrl treated OT-1), or (c) OT-1 cells that were stimulated/activated in vitro with the SIINFEKL peptide and pretreated with 25 μM of fenofibric acid (FFA), control DMSO, FFP or fenofibrate.

Figure 11:
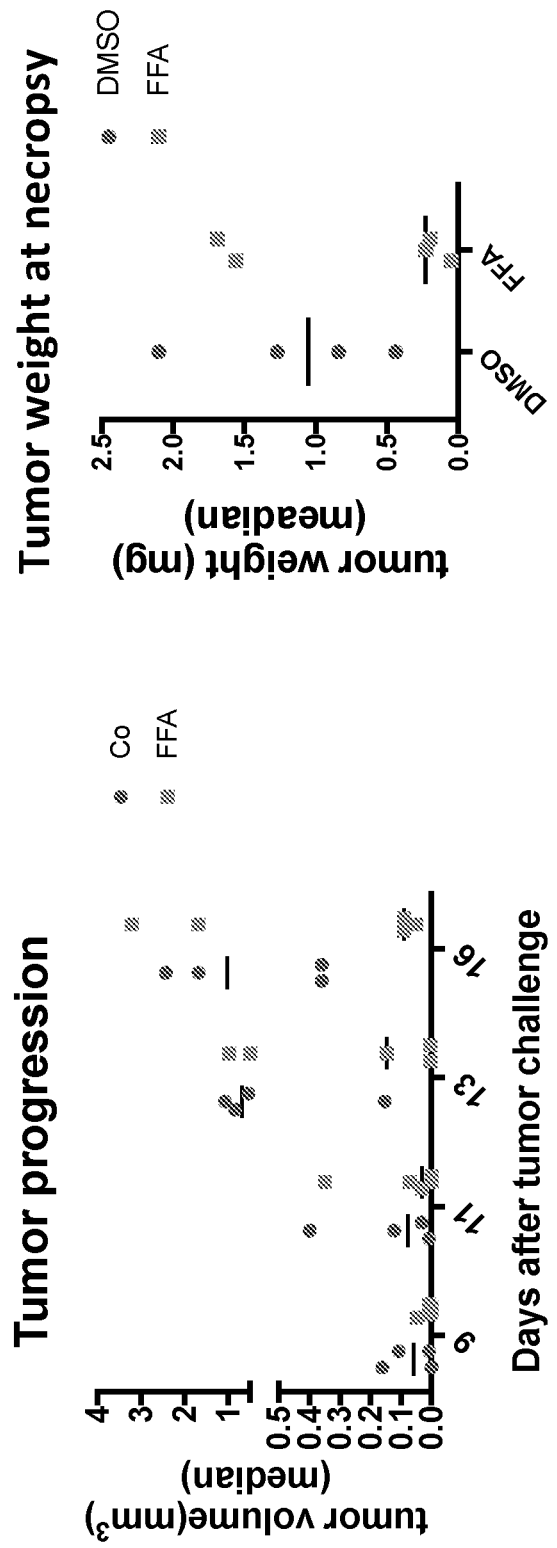
FIG. 11 shows two graphs demonstrating the results of the following protocol: OT-1 T cells were stimulated in vitro as described in FIG. 7 for 4 days. The cells were then treated for 2 days with 50 μM fenofibric acid or DMSO. Cells were injected i.v. into C57B1/6 recipient mice that had been injected 5 days earlier with B16OVA tumor cells. Tumor sizes were monitored. Tumor weights were measured at necropsy. These data show that fenofibric acid pre-treatment of OT-1 CD8+ T cells increases in vivo efficacy in the $B16_{OVA}$ model.
Figure 12:
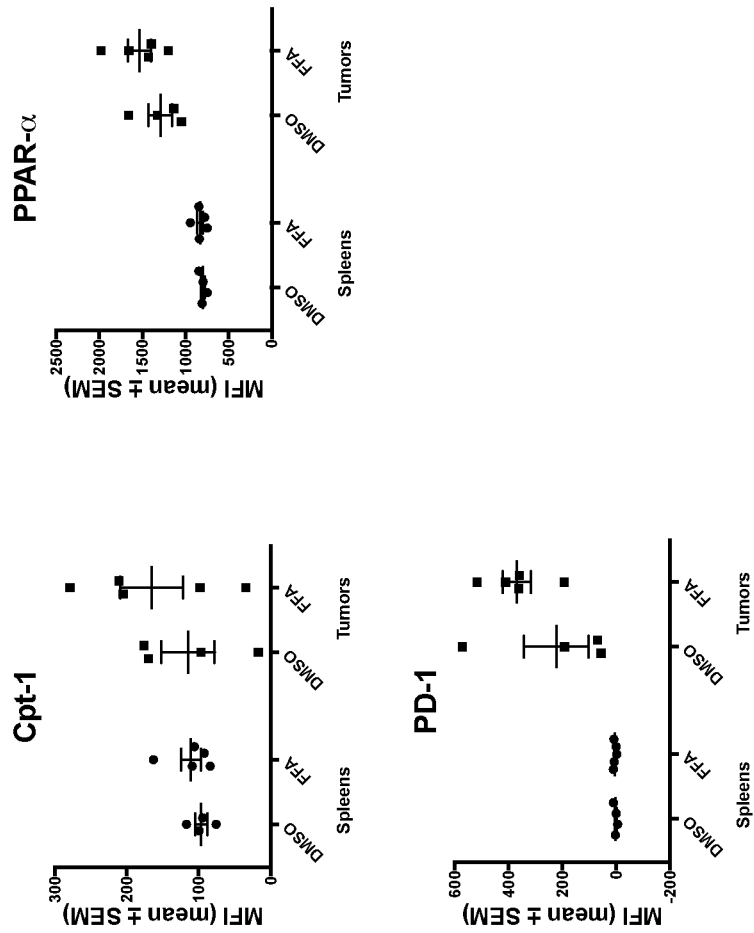
FIG. 12 shows three graphs demonstrating the effect of fenofibric acid on TIL metabolism resulting from the following protocol: CD8+ T cells from spleens and tumors of the mice described in FIG. 11 were tested for expression levels of Cpt-1, a transporter that is essential for transfer of fatty acids into mitochondria, PPAR-α, the transcription factor that regulates fatty acid metabolism, and PD-1, a co-inhibitor that through blockade of glycolysis promotes fatty acid catabolism.

Tumor growth in the mouse models was monitored for up to 24 days. The results are depicted in the graph of FIG. 11 showing that the growth of the tumor in mice treated with FFA-pre-treated, activated T cells was inhibited compared to the response in the naïve, non-activated OT-1 cells or the activated, control-treated T cells.

Thus, the pretreated, activated T cell populations, such as CAR-T cells, or others, can have their metabolic functions switched and, when administered to a subject with a tumor, act to repress tumor growth. Such effect can be accomplished by administering pre-treated T cells alone, i.e., without any other anti-cancer immunotherapeutic, such as a tumor antigen specific vaccine. Thus, the methods and compositions described herein are useful in adoptive T cell transfer therapeutic treatments using T cells, e.g., CAR-T cells, pretreated to switch their metabolic functions, resulting in enhanced treatment of cancer patients.

As supported by the results, metabolic reprogramming of $CD8^+$T cells to increase energy production through FA catabolism prior to adoptive cell transfer enhances the overall efficacy of cell therapy in patients with some types of cancers, especially those characterized by low Glu content, like melanomas. In agreement, other studies show that memory $CD8^+$T cells, which prefer fatty acid catabolism and OXPHOS for energy production, are better at slowing tumor progression than effector cells[31,8]. In contrast, others report that increasing the TIL's ability to use glycolysis improves their antitumor effect[6]. Which metabolic manipulations are most suited to improve TIL-mediated tumor regression depends on the nature of the tumor. Those with sufficient levels of Glu may benefit from $CD8^+$T cells with high glycolytic potential while tumors with a hypoglycemic TME may best be combated by $CD8^+$T cells, which favor FA catabolism.

The inventors have determined that treatment with an anti-PD-1 mAb slows tumor progression without changing CD8+ TILs' metabolism or functions. Treatment with anti-PD-1 effectively delays tumor progression in vaccinated as well as unvaccinated or even immune-deficient NSG mice, which lack T, B, and natural killer cells, suggesting that PD-1 checkpoint blockade delays tumor progression in a T cell-independent manner.

Anti-PD-1 treatment acts synergistically with metabolic reprogramming of TILs to achieve superior antitumor efficacy. Both fenofibrate treatment (FF-an agonist of PPAR-alpha that increases FA catabolism) of donors and anti-PD-1 treatment of recipients strongly delay tumor progression and act synergistically together to completely prevent tumor outgrowth in more than 30% of vaccinated mice.

EXAMPLE 2

To reprogram CD8+ T cells while they are undergoing stimulation and expansion in vitro towards the use of fatty acid catabolism for energy and biomass production, fenofibric acid was compared to the PPAR-α agonist fenofibrate. Pre-treatment of T cells prior to adoptive therapy is intended to render them more resistant to the metabolically challenging tumor microenvironment (TME) and improve their functions and longevity and thereby enhance treatment efficacy.

In one embodiment, experiments were conducted with CD8+ T cells from OT-1 mice, which carry a transgenic T cell receptor (TcR) that recognizes the OVA-derived peptide SIINFEKL SEQ ID NO: 1. See, e.g., Clarke, S R et al, 2000 Characterization of the ovalbumin-specific TCR transgenic line OT-I: MHC elements for positive and negative selection., Immunol. Cell Biol, 78(2):110-117. Therefore OT-1 cells are a good model of T cells that can be stimulated with any antigen, in this case the OVA-derived peptide, rather than a tumor-specific antigen.

We initially tested stimulation of OT-1 T cells by the polyclonal activators anti-CD3 and anti-CD28 or by their cognate peptide SIINFEKL and IL-2. Cell recovery was roughly equal and we continued with peptide stimulation. To switch metabolism, we initially used fenofibrate (FF), a PPAR-α agonist that increases fatty acid metabolism or a diluent (DMSO) as a control at different concentrations (10-50 μM) at different times after the initial peptide stimulation.

In additional experiments, we switched cells after the initial stimulation in glucose-rich medium to a medium that contained galactose instead or to which the glycolysis inhibitor 2-deoxy-glucose (2-DG) was added.

We also explored combining FF treatment with culture in medium containing galactose or reduced concentrations of glucose. Lack of glucose during the last two days of culture severely impaired live cell recovery and blast formation. FF also reduced cell recovery and blast formation in a dose-dependent fashion. Live cell recovery was acceptable at 10 μM of FF, but strongly reduced at 50 μM. As expected, FF increased fatty acid catabolism as was shown by the cells' increased expression of fatty acid uptake and Cpt-1, a key enzyme that is essential for transfer of fatty acids across mitochondrial membranes. This was further confirmed by gene expression profiling which showed increases in transcripts encoding enzymes of mitochondrial and peroxisomal fatty acid beta-oxidation, triglyceride synthesis and ketone body metabolism.

Effects of PPAR-α, Glut-1 (a HIF-1α controlled receptor for glucose uptake) and PD-1 (a co-inhibitor that reduces glycolysis through inhibition of the AKT/mTor pathway) were subtle. FF caused a slight increase in expression of CD127, a marker indicative of the cells' potential to transition towards memory. It strongly increased Ki-67, a cell cycling marker and reduced expression of LAG-3. FF did not change expression levels of Eomes, but increased T-bet, a transcription factor that controls many effector T cell functions. FF had no effect on T cell proliferation in response to IL-2. Treatment with FF increased production of granzyme B (GrmB), interferon-gamma (IFN-γ), and interleukin (IL)-2. It decreased production of tumor necrosis factor-alpha (TNF)-α.

Seahorse experiments were conducted to further characterize the effects of FF on CD8+ T cell metabolism. Oxygen consumption rates, a measure of oxidative phosphorylation (OXPHOS), the pathway of energy production through fatty acid catabolism, was strongly reduced in fenofibrate (FF)-treated cells. FF not only has PPAR-α activity, but also has been shown to inhibit complex I of the electron transport chain through a PPAR-α-independent mechanism.[53] Once FF enters cells some of it is de-esterifies into fibrofibric acid (FFA), which has PPAR-α agonist activity but is believed to not enter mitochondria and therefore does not inhibit complex I.[53]

FF accumulates in the mitochondria presumably due to its lipophilicity and lack of negative charge i.e., ester versus carboxylic acid. Also, a comparison of the molecular structure of FF and Rotenone, a potent complex I inhibitor, suggests a common alkoxy-phenyl-one pharmacophore for the complex I activity.

A novel prodrug ester of FF (FFP or Compound 4; see Example 3 below) was developed by linking FFA to an amine to potentially improve cell permeability through the interaction with the peptide transporter PepT1 or an analogous amino acid transporter. See, FIG. 14.

Cells were treated with 10 or 100 µM of FFA or FFP for the last 2 days of culture. At 100 µM, FFP but not FFA reduced blast formation. See, FIG. 9. Both drugs increased OXPHOS as shown by increased oxygen consumption rates. Both drugs increased fatty acid uptake although this was more pronounced with FFP.

To assess how metabolic reprogramming affects tumor antigen-specific CD8+ T cells within a TME, mice were challenged with B16OVA tumor cells. Five days later they received intravenously OT-1 cells that had been stimulated in vitro with SIINFEKL and to which drug or diluent was added for the last 2 days of culture. Tumor progression was monitored and once tumors became large, splenocytes and tumor-infiltrating cells were isolated and characterized.

Results of the initial experiments, in which we transferred cells that had been treated with 10 µM of FF, showed no delay in tumor progression in mice that received FF-treated cells compared to those that received diluent treated cells. Increases in donor cell recovery or functions were not observed.

In another experiment, we treated cells with 100 µM of FFA (or as a control DMSO) for the last 2 days of culture. Upon their transfer in B16OVA carrying recipient mice (n=5/group), all mice that received DMSO-treated cells showed tumor progression, and one died. In the FFA group, 2 mice developed progressing tumors, the other 3 only had small tumors that failed to grow; they also changed consistency. Progressing tumors were soft on palpitation; tumors in the 3 'protected mice' were firm. We analyzed tumor weights and splenocytes and tumor infiltrating lymphocytes (TILs) at necropsy for recovery, phenotypes, and functions of the donor OT-1 cells. See, FIG. 11, left graft.

The weight of the recovered tumors was very low in three mice of the FFA group. Comparing donor cell survival within the hosts there was a trend towards higher recovery from spleens of the FFA group. See, FIG. 11, right graph. Phenotypically there were trends towards higher expression of Cpt-1 and PPAR-α in FFA-pre-treated donor CD8+ TILs. There was also a trend towards higher PD-1 expression. Overall these data indicated that FFA-pre-treated OT-1 cells increased metabolism of fatty acids compared to diluent-treated cells. See graphs of FIG. 12.

Very significant increases in frequencies of function-positive FFA-pre-treated donor cells were observed in spleens but not tumors. Increases mainly reflected higher frequencies of polyfunctional donor cells.

In conclusion, not only did FFA pre-treatment of CD8+ T cells directed to a surrogate tumor antigen delay tumor progression in more than half of the mice, but pre-treatment also increased percentages of function-positive donor cells in spleens, thus augmenting the pool of cells able to infiltrate and combat the tumor.

EXAMPLE 3

The synthetic scheme for the production of the novel FFA prodrug Compound 4 is shown schematically in FIG. 15, and involves the individual reactions including intermediates described below.

Reaction (1): To a solution of Fmoc-Ala-OH (1475 mg, 5.0 mmol) dissolved in 70 ml dichloromethane, was added HBTU (2086 mg, 5.5 mmol) at 0° C. and the mixture was stirred at room temperature for 10-15 min followed by the addition of L-Glutamic acid di-tert-butyl ester hydrochloride (1555 mg, 5.0 mmol) and triethylamine (1670 mg, 16.5 mmol) and stirred for 6-8 h. After completion of the reaction (monitored by LC-MS), water was added to the reaction mixture and the aqueous layer was extracted with dichloromethane (3×50 ml). The combined organic layer was washed with brine solution, dried over anhydrous sodium sulfate, filtered, and evaporated to give a viscous liquid which on column purification (0-50% ethyl acetate/hexane) provided desired (S)-di-tert-butyl 2-((S)-3-((9H-fluoren-9-yl)methoxy)-2-methyl-3-oxopropanamido) pentane dioate (1) (2185 mg, 79.08% yield) as colorless liquid. LC-MS: m/z 575 [M+23].

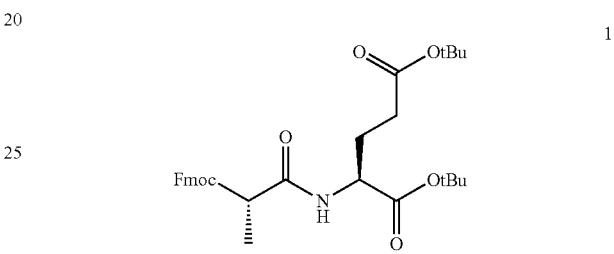

Reaction 2: To a solution of (S)-di-tert-butyl2-((S)-3-((9H-fluoren-9-yl)methoxy)-2-methyl-3-oxopropanamido) pentanedioate (1) in DMF (10 ml) was added 5% piperidine in DMF and the reaction mixture was stirred at room temperature for 1 hour. After completion of the reaction (monitored by LC-MS), water was added to the mixture. The resulting white precipitate was filtered, washed with water (20 ml), and the filtrate was extracted with ethyl acetate (3×100 ml). The combined organic layer was washed with brine solution, dried over anhydrous sodium sulfate, filtered, and evaporated to give (S)-di-tert-butyl 2-((S)-2-aminopropanamido)pentanedioate (2) as a viscous colorless liquid which was used for the next step without column purification (1037 mg, 79.46% yield). LC-MS: m/z 331 [M+1].

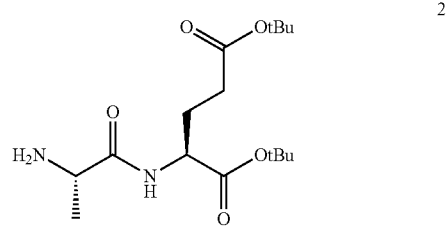 [SMILES: C[C@H](N)C(=O)N[C@@H](CCC(=O)OC(C)(C)C)C(=O)OC(C)(C)C]

Reaction 3: To a solution of fenofibric acid (100 mg, 0.313 mmol) in 5 ml anhydrous dichloromethane was added EDCI (72 mg, 0.375 mmol) at 0° C. followed by the addition of HOBt (57 mg, 0.375 mmol). After 10 min. amine compound 2 (114 mg, 0.344 mmol) dissolved in 1 ml dichloromethane was added to the reaction mixture, followed by the addition of DIPEA (97 mg, 0.751 mmol), and the reaction mixture was stirred at room temperature for 8-10 h. After completion of the reaction by disappearance of the starting material in TLC, water was added to the reaction mixture, and the aqueous layer was extracted with dichloromethane (3×25 ml). The combined organic layer was washed with brine solution, dried over anhydrous sodium sulfate, filtered, and evaporated to give a viscous liquid. The crude residue was purified by flash chromatography (Silica gel, 0-50% ethyl acetate/hexane, gradient elution) to afford (S)-di-tert-butyl2-((S)-2-(2-(4-(4-chlorobenzoyl)phenoxy)-2-methylpropanamido)propanamido) pentanedioate (3) (140 mg, 71.00%) as colorless viscous liquid. LC-MS:m/z 654 [M+23].

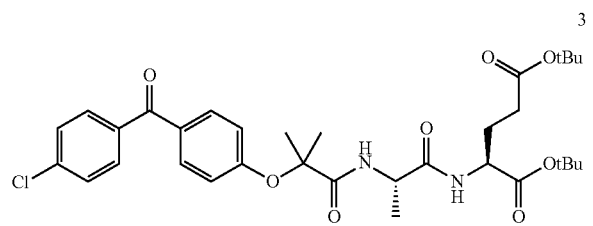 [SMILES: C[C@H](NC(=O)C(C)(C)Oc1ccc(C(=O)c2ccc(Cl)cc2)cc1)C(=O)N[C@@H](CCC(=O)OC(C)(C)C)C(=O)OC(C)(C)C]

3

Reaction 4: To a solution of compound 3 (140 mg, 0.22 mmol) in 5 ml dichloromethane, was added 1.0 ml of TFA slowly at 0° C. The mixture was stirred at room temperature for 4-6 h. After starting material disappeared the reaction mixture was concentrated under vacuum, toluene was added to the precipitated white solid several times and evaporated under vacuum to remove traces of toluene and TFA. The resulting solid was filtered, washed with 10% ethyl acetate/ hexane, and dried over vacuum to obtain desired final (S)-2-((S)-2-(2-(4-(4-chlorobenzoyl)phenoxy)-2-methylpropanamido)propanamido) pentanedioic acid (4) (75 mg, 68.80% yield) as white solid. LC-MS:m/z 519 [M+].

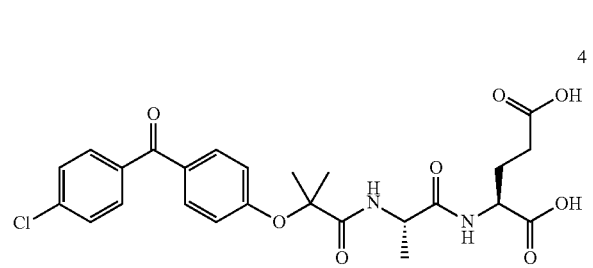 [SMILES: C[C@H](NC(=O)C(C)(C)Oc1ccc(C(=O)c2ccc(Cl)cc2)cc1)C(=O)N[C@@H](CCC(=O)O)C(=O)O]

4

EXAMPLE 4

The synthetic scheme for the production of the novel FFA prodrug Compound 8 is shown schematically in FIG. 16, and involves the individual reactions including intermediates described below.

Reaction 1: To a solution of fenofibric acid (319 mg, 1.0 mmol) in 10 ml anhydrous tetrahydrofuran was added dicyclohexylcarbodiimide (309 mg, 1.5 mmol) at room temperature followed by the addition of a catalytic amount of DMAP (24 mg, 0.20 mmol). Benzyl 2-hydroxyacetate (166 mg, 1.0 mmol) was added to the reaction mixture and the mixture was stirred at room temperature for 8-10 h. After completion of the reaction by disappearance of starting material by TLC, the precipitated solid was filtered, and washed with 20 ml Ethyl acetate: Hexane (5:95%), the crude filtrate was evaporated under vacuum, and purified by flash chromatography (Silica gel, 0-30% ethyl acetate/hexane, gradient elution) to afford 2-(benzyloxy)-2-oxoethyl 2-(4-(4-chlorobenzoyl)phenoxy)-2-methylpropanoate (5) (431 mg, 92.31%) as a viscous colorless liquid LC-MS:m/z 467 [M+].

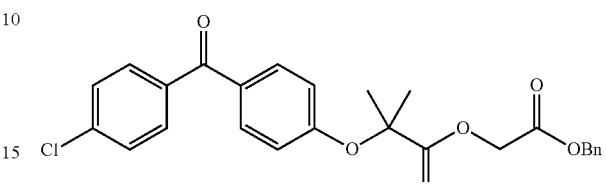

5

Reaction 2: To a solution of 2-(benzyloxy)-2-oxoethyl 2-(4-(4-chlorobenzoyl)phenoxy)-2-methylpropanoate (5, 400 mg, 0.856 mmol) in 10 ml methanol was added 200 mg of 10% dry Pd/C at room temperature. The reaction was put under a hydrogen atmosphere. After 2 hr. the reaction was monitored by LC-MS to see disappearance of starting material. The Pd/C was filtered through a small bed of celite and washed with 20 ml methanol. The filtrate was evaporated under vacuum to obtain crude residue 2-(2-(4-(4-chlorobenzoyl)phenoxy)-2-methylpropanoyloxy)acetic acid (6) that was used for the next step without purification (283 mg, 87.69%) as viscous colorless liquid LC-MS:m/z 377 [M+1].

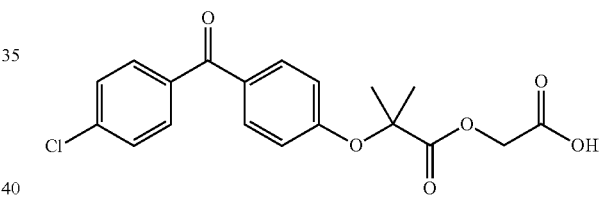

6

Reaction 3: To a solution of 2-(2-(4-(4-chlorobenzoyl) phenoxy)-2-methylpropanoyloxy)acetic acid (6) (150 mg, 0.398 mmol) in 5 ml anhydrous dichloromethane was added EDCI (92 mg, 0.477 mmol) at 0° C. followed by the addition of hydroxybenzotriazole (73 mg, 0.477 mmol) after 10 min. Compound 2 (145 mg, 0.437 mmol) dissolved in 1 ml dichloromethane was added to the reaction mixture followed by the addition of DIPEA (123 mg, 0.955 mmol), and the reaction mixture was stirred at room temperature for 8-10 h. After completion of the reaction by disappearance of starting material in TLC, water was added to the reaction mixture, and the aqueous layer was extracted with dichloromethane (3×25 ml). The combined organic layer was washed with brine solution, dried over anhydrous sodium sulfate, filtered, and evaporated to give a viscous liquid. The resulting crude residue was purified by flash chromatography (Silica gel, 0-50% ethyl acetate/hexane, gradient elution) to afford (S)-di-tert-butyl2-((S)-2-(2-(2-(4-(4-chlorobenzoyl)phenoxy)-2-methylpropanoyloxy)acetamido)propanamido) pentanedioate (7) (156 mg, 60.20%) as colorless viscous liquid. LC-MS:m/z 712 [M+23].

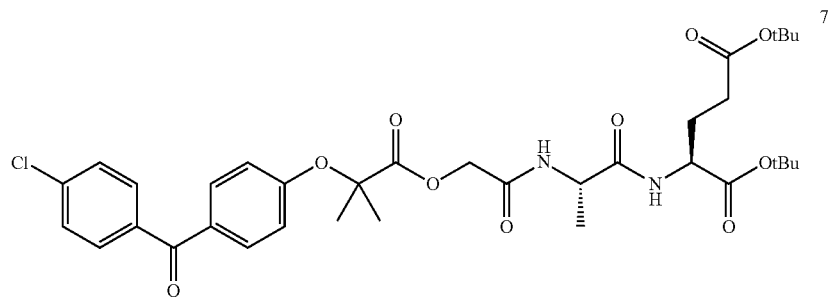 [SMILES: C[C@H](NC(=O)COC(=O)C(C)(C)Oc1ccc(C(=O)c2ccc(Cl)cc2)cc1)C(=O)N[C@@H](CCC(=O)OC(C)(C)C)C(=O)OC(C)(C)C]

Reaction 4: To a solution of compound 7 (100 mg, 0.145 mmol) in 5 ml dichloromethane, was added 1.0 ml of TFA slowly at 0° C. The mixture was stirred at room temperature for 4-6 h. After starting material disappeared (by TLC) the reaction mixture was concentrated under vacuum. Toluene was added to the resulting precipitated white solid several times and evaporated under vacuum to remove traces of toluene and TFA. The resulting residue was purified by flash column on silica gel using 0-20% MeOH/dichloromethane (gradient) to provide the desired final (S)-2-((S)-2-(2-(2-(4-(4-chlorobenzoyl)phenoxy)-2-methylpropanoyloxy)acetamido)propanamido) pentanedioic acid (8) (60 mg, 72.02% yield) as a white solid. LC-MS:m/z 717 [M$^+$].

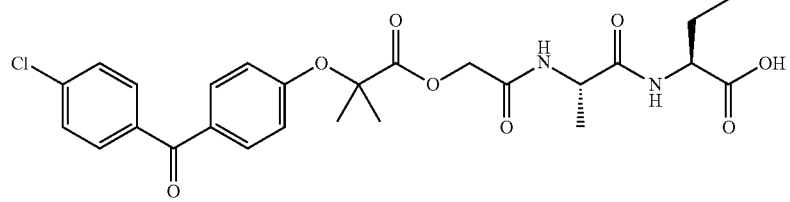

Each and every patent, patent application, including U.S. provisional application No. 62/540,338, and each and every publication, including websites cited throughout the disclosure and listed herein, and the Sequence Listing accompanying this application, is expressly incorporated herein by reference in its entirety. While this invention has been disclosed with reference to specific embodiments, it is apparent that other embodiments and variations of this invention may be devised by others skilled in the art without departing from the true spirit and scope of the invention. The appended claims include such embodiments and equivalent variations.

REFERENCES

1. Ahmadzadeh, M., et al. (2009). Tumor antigen-specific CD8 T cells infiltrating the tumor express high levels of PD-1 and are functionally impaired. Blood 114: 1537-1544.
2. Bailey, K. M., et al. (2012). Targeting the metabolic microenvironment of tumors. Adv. Pharmacol. 65, 63-107.
3. Baitsch, L. (2011). Exhaustion of tumor-specific CD8+ T cells in metastases from melanoma patients. J. Clin. Invest. 121:2350-60.
4. Brahmer, J. R., et al. (2012). Safety and Activity of Anti-PD-L1 Antibody in Patients with Advanced Cancer. N. Engl. J. Med. 366, 2455-2465.
5. Bucks, C. M., et al. (2009). Chronic antigen stimulation alone is sufficient to drive CD8+ T cell exhaustion. J. Immunol. 182, 6697-6708.
6. Chang, C. H., et al. (2015) Metabolic Competition in the Tumor Microenvironment Is a Driver of Cancer Progression. Cell. 162, 1229-41.
7. Chapman, P. B., et al. (2015). Rapid eradication of a bulky melanoma with one dose of immunotherapy. N. Engl. J. Med. 372, 2073-2074.
8. Crompton, J. G., et al. (2015). Akt inhibition enhances expansion of potent tumor-specific lymphocytes with memory cell characteristics. Cancer. Res. 75, 296-305.
9. Dalgleish, A. G. (2011). Therapeutic cancer vaccines: Why so few randomized phase III studies reflect the initial optimism of phase II studies. Vaccine. 29: 8501-8505.
10. Doedens, A. L., et al. (2013). Hypoxia-inducible factors enhance the effector responses of CD8(+) T cells to persistent antigen. Nat Immunol. 14, 1173-82.
11. Finlay, D., et al. (2012). PDK1 regulation of mTOR and hypoxia-inducible factor 1 integrate metabolism and migration of CD8+ T cells. J. Exp. Med. 209, 2441-2453.
12. Grosso, J. F., et al. (2007). LAG-3 regulates CD8+ T cell accumulation and effector function in murine self-and tuor-tolerance systems. J. Clin. Invest. 117, 3383-3392.
13. Hamanaka, R. B. and Chandel, N. S. (2012). Targeting glucose metabolism for cancer therapy. J. Exp. Med. 209, 211-215.
14. Ho, P. C., et al. (2015). Phosphoenolpyruvate is a metabolic checkpoint of anti-tumor T cell response. Cell. 162; 1217-28.
15. Lasaro, M. O. et al. (2008). Targeting of antigen to the herpesvirus entry mediator augments primary adaptive immune responses. Nat. Med. 14, 205-212.

16. Lochner, M., et al (2015). Fatty acid metabolism in the regulation of T cell function. Trends Immunol. 36: 472-478.

17. Lu, W., et al. (2010). Metabolomic analysis via reversed-phase ion-pairing liquid chromatography coupled to a stand-alone orbitrap mass spectrometer. Anal. Chem. 82, 3212-21.

18. Martinez-Outschoorn, U. E., et al (2012). Ketone body utilization drives tumor growth and metastasis. Cell Cycle. 11, 3964-71.

19. Mazzone, M. (2014). Tumor stroma: a complexity dictated by the hypoxic tumor microenvironment. Oncogene 33, 1743-1754.

20. McNamee, E. N. (2013). Hypoxia and hypoxia-inducible factors as regulators of T cell development, differentiation, and function. Immunol. Res. 55, 58-70.

21. Mendendez, J. A. and Lupu, R. (2007). Fatty acid synthase and lipogenic phenotype in cancer pathogenesis. Nat. Rev. Cancer. 7, 763-777.

22. Mueller, S. N. and Ahmed, R. (2009). High antigen levels are the cause of T cell exhaustion during chronic viral infection. Proc. Natl. Acad. Sci. 106, 8623-8628.

23. Palmer, C. S., et al. (2015). Glucose metabolism regulates T cell activation, differentiation, and functions. Frontiers Immunol. 6, 1-6.

24. Parry, R. V., et al. (2005). CTLA-4 and PD-1 receptors inhibit T-cell activation by distinct mechanisms. Mol. Cell. Biol. 25, 9543-53.

25. Patsoukis, N., et al. (2015). PD-1 alters T-cell metabolic reprogramming by inhibiting glycolysis and promoting lipolysis and fatty acid oxidation. Nat. Commun. 6, 6692.

26. Pearce, E. L. (2013). Fueling immunity: insights into metabolism and lymphocyte function. Science. 342; 1242454.

27. Pescador, N., et al. (2005). Identification of a functional hypoxia-responsive element that regulates the expression of the egl nine homologue 3 (egln3/phd3) gene. Biochem. J. 390, 189-197.

28. Schlie, K., et al. (2011). When Cells Suffocate: Autophagy in Cancer and Immune Cells under Low Oxygen. Int J Cell Biol 2011, 470597-13.

29. Sharma, P. and Allison, J. P. (2015). Immune checkpoint targeting in cancer therapy: toward combination strategies with curative potential. Cell. 161, 205-214.

30. Siska, P. J. and Rathmell, J. C. (2015) T cell metabolic fitness in antitumor immunity. Trends Immunol. 36, 257-64.

31. Sukumar, M., et al. (2013). Inhibiting glycolytic metabolism enhances CD8+T cell memory and antitumor function. J. Clin. Invest. 123, 4479-88.

32. Takahashi, S., et al. (2014). Roles and regulation of ketogenesis in cultured astroglia and neurons under hypoxia and hypoglycemia. ASN. Neuro. 6, 5.

33. Veech, R. L. (2004). The therapeutic implications of ketone bodies: the effects of ketone bodies in pathological conditions: ketosis, ketogenic diet, redox states, insulin resistance, and mitochondrial metabolism. Prostaglandins. Leukot. Essent. Fatty. Acids. 70, 309-19

34. Wang, R. W. and Green, D. R. (2012). Metabolic checkpoints in activated T cells. Nat. Immunol. 13, 907-915.

35. Warburg, O., On respiratory impairment in cancer cells. (1956). Science. 124, 269-70.

36. Wherry, E. J. T cell exhaustion. (2011). Nat. Immunol. 12:492-499.

37. Wiig, H., et al. (2003). Isolation of interstitial fluid from rat mammary tumors by a centrifugation method. Am. J. Physiol. Heart. Circ. Physiol. 284, H416-24.

38. Yang, J. C. (2013). The adoptive transfer of cultured T cells for patients with metastatic melanoma. Clinics Dermatol. 31, 209-219.

39. Zhang, Y., et al. (2012). Stromal progenitor cells from endogenous adipose tissue contribute to pericytes and adipocytes that populate the tumor microenvironment. Cancer Res. 72, 5198-208.

40. Zhang, Y. and Ertl, H. C. (2014). The effect of adjuvanting cancer vaccines with herpes simples virus glycoprotein D on melanoma-driven CD8+ T cell exhaustion. J. Immunol. 193: 1836-1846.

41. Kalos, M. et al (2011) T cells with chimeric antigen receptors have potent antitumor effects and can establish Memory in Patients with Advanced Leukemia. Sci Transl Med., 3(95): 73

42. Azuma, T., et al., 2008. B7-H1 is a ubiquitous antiapoptotic receptor on cancer cells. Blood 111, 3635-3643

43. Kleffel, S., et al., 2015. Melanoma Cell-Intrinsic PD-1 Receptor Functions Promote Tumor Growth. Cell 162, 1242-1256.

44. Larkin, J., et al., 2015. Combined Nivolumab and Ipilimumab or Monotherapy in Untreated Melanoma. N Engl J Med 373, 23-34.

45. Marvel, D., Gabrilovich, D. I., 2015. Myeloid-derived suppressor cells in the tumor microenvironment: expect the unexpected. J. Clin. Invest. 125, 3356-3364.

46. Mrass, P., et al., 2006. Random migration precedes stable target cell interactions of tumor-infiltrating T cells. Journal of Experimental Medicine 203, 2749-2761.

47. Ohta, A., et al., 2011. In vivo T cell activation in lymphoid tissues is inhibited in the oxygen-poor microenvironment. Front Immunol 2, 27.

48. Patsoukis, N., et al, 2013. PD-1 increases PTEN phosphatase activity while decreasing PTEN protein stability by inhibiting casein kinase 2. Mol. Cell. Biol. 33, 3091-3098.

49. Tatsis, N., et al., 2007. Adenoviral vectors persist in vivo and maintain activated CD8+ T cells: implications for their use as vaccines. Blood 110, 1916-1923.

50. Zhang, F., 2012. Dysregulated lipid metabolism in cancer. World Journal of Biological Chemistry 3, 167

51. Zou, W., et al., 2016. PD-L1 (B7-H1) and PD-1 pathway blockade for cancer therapy: Mechanisms, response biomarkers, and combinations. Sci Transl Med 8, 328rv4-328rv4.

52. Clarke, S R et al, 2000 Characterization of the ovalbumin-specific TCR transgenic line OT-I: MHC elements for positive and negative selection., Immunol. Cell Biol, 78(2):110-117

53. Wilk, A et al, 2015 January, Molecular Mechanisms of Fenofibrate-Induced Metabolic Catastrophe and Glioblastoma Cell Death., Mol. Cell. Biol., 35(1):182-198

54. International publication patent application No. WO2017/123911, published Jul. 20, 2017

The invention claimed is:

1. A method for treating cancer comprising administering to a subject having a cancer a T cell or T cell population that is pretreated or conditioned ex vivo or in vitro with fenofibric acid (FFA), an FFA prodrug, or a derivative thereof that has PPAR-α agonist activity wherein the FFA prodrug is(S)-2-((S)-2-(2-(4-(4-chlorobenzoyl)phenoxy)-2-methyl propanamido)propanamido) pentanedioic acid (FFP or Compound 4) or(S)-2-((S)-2-(2-(2-(4-(4-chlorobenzoyl) phenoxy)-2-methylpropanoyloxy)acetamido)propanamido) pentanedioic acid (Compound 8).

2. The method according to claim 1, further comprising administering a checkpoint inhibitor in the form of an antibody or a small molecule.

3. The method according to claim 2, wherein the checkpoint inhibitor is an anti-PD-1 antibody or small molecule ligand.

4. The method according to claim 1, wherein the T cell is an autologous or heterologous, naturally occurring T cell or a recombinantly or synthetically modified T cell construct, or a human T cell or natural killer (NK) T cell or T infiltrating lymphocyte (TIL) obtained from the subject or from a bone marrow transplant match for the subject, or a T cell obtained from human peripheral blood or from the tumor microenvironment of the subject, or a T cell modified to express a heterologous antigen receptor, or a chimeric antigen receptor or a chimeric endocrine receptor prior to said pretreatment, or an endogenous or heterologous human T cell or human T cell line, or a CD8+ T cell.

5. The method according to claim 1, wherein the pretreated T cells are administered (a) once or repeatedly or (b) are administered in a single dose or as one or more doses or (c) are administered systemically by intravenous injection or infusion.

6. The method according to claim 1, wherein the cancer or tumor targeted by the method is characterized by hypoxia, significant infiltration with T lymphocytes, and low glucose in the tumor microenvironment.

7. A composition comprising a T cell or T cell population that has been pretreated ex vivo or in vitro with fenofibric acid (FFA), a prodrug thereof, or a derivative thereof that has PPAR-α agonist activity.

8. The composition according to claim 7, wherein the prodrug is Compound 4 or Compound 8.

9. The composition according to claim 7, wherein said FFA, prodrug or derivative enhances cellular biomass production in activated T cells in vitro.

10. The composition according to claim 7, wherein the T cell is an autologous or heterologous, naturally occurring T cell or a recombinantly or synthetically modified T cell construct, or a human T cell or natural killer (NK) T cell or T infiltrating lymphocyte (TIL) obtained from the subject or from a bone marrow transplant match for the subject, or a T cell obtained from human peripheral blood or from the tumor microenvironment of the subject, or a T cell modified to express a heterologous antigen receptor, or a chimeric antigen receptor or a chimeric endocrine receptor prior to said pretreatment, or an endogenous or heterologous human T cell or human T cell line, or a CD8+ T cell, is a chimeric antigen receptor-T cell or a chimeric endocrine receptor-T cell or an ex vivo expanded tumor antigen-specific T cells that is pretreated before adoptive cell transfer to a subject having a solid tumor.

11. A method of modifying a T cell comprising pretreating the T cell ex vivo or in vitro with fenofibric acid (FFA), an FFA prodrug, or a derivative thereof that has PPAR-α agonist activity.

12. The composition according to claim 11, wherein the prodrug is Compound 4 or Compound 8.

13. The method according to claim 1, wherein the cancer is melanoma.

14. The method of claim 1, wherein the FFA, FFA prodrug, or derivative thereof is FFA.

* * * * *